(12) United States Patent
Kwon et al.

(10) Patent No.: US 12,284,066 B2
(45) Date of Patent: Apr. 22, 2025

(54) APPARATUS AND METHOD FOR EFFECTIVELY MAPPING REFERENCE SIGNAL FOR V2X COMMUNICATION IN WIRELESS COMMUNICATION SYSTEM

(71) Applicant: SAMSUNG ELECTRONICS CO., LTD., Suwon-si (KR)

(72) Inventors: Yangsoo Kwon, Seoul (KR); Joonsung Kim, Hwaseong-si (KR); Jinwoo Oh, Seogwipo-si (KR); Yongin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 717 days.

(21) Appl. No.: 17/398,381

(22) Filed: Aug. 10, 2021

(65) Prior Publication Data

US 2022/0070036 A1    Mar. 3, 2022

(30) Foreign Application Priority Data

Sep. 2, 2020 (KR) .................. 10-2020-0111696
Dec. 9, 2020 (KR) .................. 10-2020-0171377

(51) Int. Cl.
*H04L 27/26* (2006.01)
*H04W 4/40* (2018.01)
(Continued)

(52) U.S. Cl.
CPC .......... *H04L 27/2613* (2013.01); *H04W 4/40* (2018.02); *H04W 72/20* (2023.01); *H04W 92/10* (2013.01)

(58) Field of Classification Search
None
See application file for complete search history.

(56) References Cited

U.S. PATENT DOCUMENTS 9,648,588 B2    5/2017  Kim et al.
10,757,550 B2   8/2020  Lee et al.
(Continued)

FOREIGN PATENT DOCUMENTS

CN   201910736219.0   *   8/2019
KR   10-2017-0053436      5/2017
(Continued)

OTHER PUBLICATIONS

Author Unknown, Discussion of physical layer structure for sidelink, Doc. No. R1-1911952, pp. 1-13, Nov. 22, 2019.*

(Continued)

*Primary Examiner* — Christopher M Crutchfield
(74) *Attorney, Agent, or Firm* — F. CHAU & ASSOCIATES, LLC

(57) ABSTRACT

An apparatus and a method for effectively mapping a reference signal for vehicle-to-everything (V2X) communication in a wireless communication system are provided. A transmission terminal performing the V2X communication includes a processor generating sidelink control information (SCI) and a transceiver transmitting the generated SCI to a reception terminal through a physical sidelink control channel (PSCCH) and a physical sidelink shared channel (PSSCH). A decision on whether to allocate a demodulation reference signal (DMRS) of the PSSCH and the PSCCH to the same orthogonal frequency division multiplexing (OFDM) symbol is made based on a number of subchannels and at least one sized thereof.

20 Claims, 22 Drawing Sheets

(51) Int. Cl.
*H04W 72/20* (2023.01)
*H04W 92/10* (2009.01)

(56) References Cited

U.S. PATENT DOCUMENTS

| | | | |
|---|---|---|---|
| 2020/0229171 | A1 | 7/2020 | Khoryaev et al. |
| 2022/0232525 | A1* | 7/2022 | Lee ............... H04L 5/0053 |
| 2022/0271892 | A1* | 8/2022 | Peng ............... H04L 5/0094 |
| 2022/0376859 | A1* | 11/2022 | Lee ............... H04W 4/40 |

FOREIGN PATENT DOCUMENTS

| | | |
|---|---|---|
| KR | 10-2018-0036355 | 4/2018 |
| KR | 10-2019-0131381 | 11/2019 |
| KR | 10-2020-0050310 | 5/2020 |

OTHER PUBLICATIONS

Author Unknown, Remaining issue on physical layer structure for sidelink in NR V2X, Doc. No. R1-2000992, pp. 1-8, Mar. 6, 2020.*
Author Unknown, PHY layer structure for NR sidelink, Doc. No. R1-1912597, pp. 1-33, Nov. 22, 2019.*
Author Unknown, Sidelink physical layer structure for NR V2X, pp. 1-35, Doc. No. R1-1911882, Nov. 22, 2019.*
Author Unknown, Feature lead summary#1 for agenda item 7.2.4.1 Physical layer structure for sidelink, pp. 1-32, Doc. No. R1-1912457, Nov. 22, 2019.*
"Physical layer procedures for data (3GPP TS 38.214 version 16.2.0 Release 16)", ETSI TS 138 214 V16.2.0 (Jul. 2020), Technical Specification, 167 pages.
Apple, On NR V2X Physical Layer Structure:, 3GPP Draft; R1-1912810, 3rd Generation Partnership Project (3GPP), Moble Competenc Centre ; 650, Route Des Lucioles ; F-06921 Sophia-Antipolis Cedex France vol. RAN WG1, No. Reno, USA; Nov. 18, 2019-Nov. 22, 2019 Nov. 9, 2019 (Nov. 9, 2019), XP051823610, 15 pages.
Huawei, et al., "Sidelink physical layer structure for NR V2X", 3GPP Draft; R1-1911882, 3rd Generation Partnership Project (3GPP), Mobile Competence Centre; 650, Route Des Lucioles ; F-06921 Sophia-Antipolis Cedex ; FRANCE, vol. RAN WG1, No. Reno, USA; Nov. 18, 2019-Nov. 22, 2019 Nov. 9, 2019 (Nov. 9, 2019), XP051823064, 35, pages.
European Search Report dated Jan. 27, 2022 in corresponding European Patent Application No. 21190350.5 (9 pages).
Huawei, et al, "Sidelink physical layer structure for NRV2X", 3GPP (Nov. 22, 2019), R1-1911882, 35 pages.
Office Action dated Jan. 14, 2024 in corresponding KR Patent Application No. 10-2020-0171377, in Korean, 6 pages.
Nokia, Nokia Shanghai Bell, "Discussion of physical layer structure for sidelink", 3GPP TSG RAN WG1 99, R1-1911952, Reno, US, Nov. 18-22, 2019, Sec. 2, 13 pages.
Panasonic, "Remaining issue on physical layer structure for sidelink in NR V2X", 3GPP TSG RAN WG1 100, R1-20000992, e-Meeting, Feb. 24-Mar. 6, 2020, Sec. 2, 8 pages.
Ericsson, "PHY layer structure for NR sidelink", 3GPP TSG-RAN WG1 Meeting 99, R1-1912597, Reno, NV, US, Nov. 18-22, 2019, Sec. 3.1, 32 pages.
Office Action dated Jan. 3, 2024 in corresponding TW Patent Application No. 110132213, in Taiwanese, 8 pages.

* cited by examiner

FIG. 4
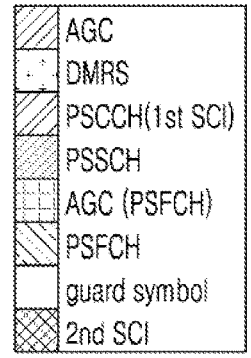
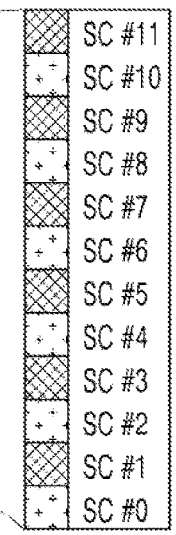

FIG. 8

| Number of subchannels | Size of subchannel | Whether multiplexing may be performed | Number |
|---|---|---|---|
| 1 | >= 20 | Multiplexing may be performed | T1 |
| | < 20 | No less than two DMRS symbols are provided Multiplexing may not be performed | T2 |
| | | Multiplexing may not be performed, One DMRS symbol is provided | T3 |
| >= 2 | >= 20 | Multiplexing may be performed | T4 |
| | < 20 | No less than two DMRS symbols are provided Multiplexing may not be performed | T5 |
| | | Multiplexing may not be performed, One DMRS symbol is provided | T6 |
| | | Multiplexing may be performed | T7 |

| Number of subchannels | Subchannel size | 2nd SCI starting location | Number |
|---|---|---|---|
| Subchannel = 1 | Subchannel size < 20 | First neighboring location of PSCCH and pssch DMRS (Location 8) | T8 |
| | | First neighboring location of PSCCH and PSSCH DMRS (Location 9) | T9 |
| Subchannel >= 2 | | Second neighboring location of PSCCH and PSSCH DMRS (location 10) | T10 |
| | | First neighboring location of PSCCH and PSSCH DMRS (Location 11) | T11 |
| | | First neighboring location of PSCCH and PSSCH DMRS (Location 12) | T12 |

< T8 >

< T10 >

< T12 >

APPARATUS AND METHOD FOR EFFECTIVELY MAPPING REFERENCE SIGNAL FOR V2X COMMUNICATION IN WIRELESS COMMUNICATION SYSTEM

CROSS-REFERENCE TO RELATED APPLICATIONS

This application is based on and claims priority under 35 U. S. C. § 119 to Korean Patent Application Nos. 10-2020-0111696 and 10-2020-0171377, respectively filed on Sep. 2, 2020 and Dec. 9, 2020, in the Korean Intellectual Property Office, the disclosures of which are incorporated by reference herein in their entireties.

TECHNICAL FIELD

This disclosure relates generally to wireless communications and more particularly to an apparatus and a method for effectively mapping a reference signal for vehicle-to-everything (V2X) communication in a wireless communication system.

DISCUSSION OF RELATED ART

The fifth generation (5G) technology standard of wireless broadband networks, defined by the third generation partnership project (3GPP), is the latest version to have begun commercialization. To obtain high data transmission rates, a 5G communication system may sometimes operate in an ultrahigh frequency (mmWave) band (e.g., a 60 GHz band). In a 5G system, to reduce path loss of an electromagnetic (EM) wave in the ultrahigh frequency band and to increase a transmission distance of the EM wave, beamforming technology, massive multi-input and multi-output (MIMO) technology, full dimensional MIMO (FD-MIMO) technology, array antenna technology, analog beam-forming technology, and/or large scale antenna technology may be applied.

To improve network efficiency/performance in 5G, technology such as an evolved small cell, an advanced small cell, a cloud radio access network (RAN), an ultra-dense network, device to device (D2D) communication, wireless backhaul, a moving network, cooperative communication, coordinated multi-points (COMP), and/or interference cancellation may be implemented.

Moreover, techniques such as hybrid frequency shift keying and quadrature amplitude modulation (FQAM); sliding window superposition coding (SWSC), which is an advanced coding modulation (ACM) method; filter bank multicarrier (FBMC); non-orthogonal multiple access (NOMA); and/or sparse code multiple access (SCMA), which is advanced access technology, may be utilized in a 5G system.

Vehicle-to-everything (V2X) is a vehicular communication system technology in which a first vehicle may communicate another entity, such as a second vehicle, that may affect or be affected by the first vehicle. A V2X protocol according to the 4th generation (4G) wireless standard is known as long term evolution vehicle-to-everything (LTE V2X). Rel-16 of 5G new radio (NR) also prescribes a vehicle-to-everything protocol, namely NR V2X. LTE V2X supports only broadcast, whereas NR V2X also supports unicast and groupcast. Rel-16 defines sidelink (SL) communication based on the 5G NR air interface, where sidelink refers to direct communication between user equipment (UE) or terminal nodes without the data passing through the 5G network. UEs in NR V2X include vehicles, mobile devices carried by pedestrians, and Road Side Units (RDUs). NR V2X also defines sidelink physical channels including a physical sidelink control channel (PSCCH), a physical sidelink shared channel (PSSCH), and a physical sidelink broadcast channel (PSBCH), as well as a signal referred to as a Demodulation Reference Signal (DMRS) used by a receiver for decoding an associated sidelink physical channel.

SUMMARY

Embodiments of the inventive concept provide an apparatus and a method for effectively mapping a reference signal for vehicle-to-everything (V2X) communication in a wireless communication system.

According to an aspect of the inventive concept, there is provided a transmission terminal performing vehicle-to-everything (V2X) communication, including a processor configured to generate sidelink control information, and a transceiver configured to transmit the generated SCI to a reception terminal through a physical sidelink control channel (PSCCH) and a physical sidelink shared channel (PSSCH). A decision on whether to allocate a demodulation reference signal (DMRS) of the PSSCH, and the PSCCH, to the same OFDM symbol is determined based on a number of subchannels and at least one size thereof.

According to an aspect of the inventive concept, there is provided a reception terminal performing V2X communication including a transceiver receiving sidelink control information (SCI) from a transmission terminal through a PSCCH and a PSSCH and decoding the PSSCH based on the received SCI and a processor controlling the transceiver. A decision on whether to allocate a demodulation reference signal (DMRS) of the PSSCH, and the PSCCH, to the same OFDM symbol is made based on a number of subchannels and at least one size thereof.

In another aspect, a method of communicating in a V2X communication system, the method includes: generating, at a transmission terminal, SCI for transmission to a reception terminal; determining whether to allocate: (i) a DMRS of a PSSCH, and (ii) a PSCCH, to the same OFDM symbol, based on a number of subchannels and at least one size thereof; and transmitting the CSI over the PSSCH and PSCCH to the reception terminal in accordance with the determination.

BRIEF DESCRIPTION OF THE DRAWINGS

Embodiments of the inventive concept will be more clearly understood from the following detailed description taken in conjunction with the accompanying drawings in which:

FIGS. 3, 4 and 5 are views illustrating a structure of a time-frequency domain applied to a sidelink of a new radio (NR) communication system according to an embodiment of the inventive concept;

FIG. 8 is a table illustrating a method of determining whether to allocate a physical sidelink shared channel-demodulation reference signal (PSSCH DMRS) and a physical sidelink control channel (PSCCH) to the same orthogonal frequency division multiplexing (OFDM) symbol;

FIG. 16 is a table illustrating a method of determining a location in which second sidelink control information (SCI) starts to be allocated according to an embodiment of the inventive concept;

DETAILED DESCRIPTION OF EMBODIMENTS

Figure 1:
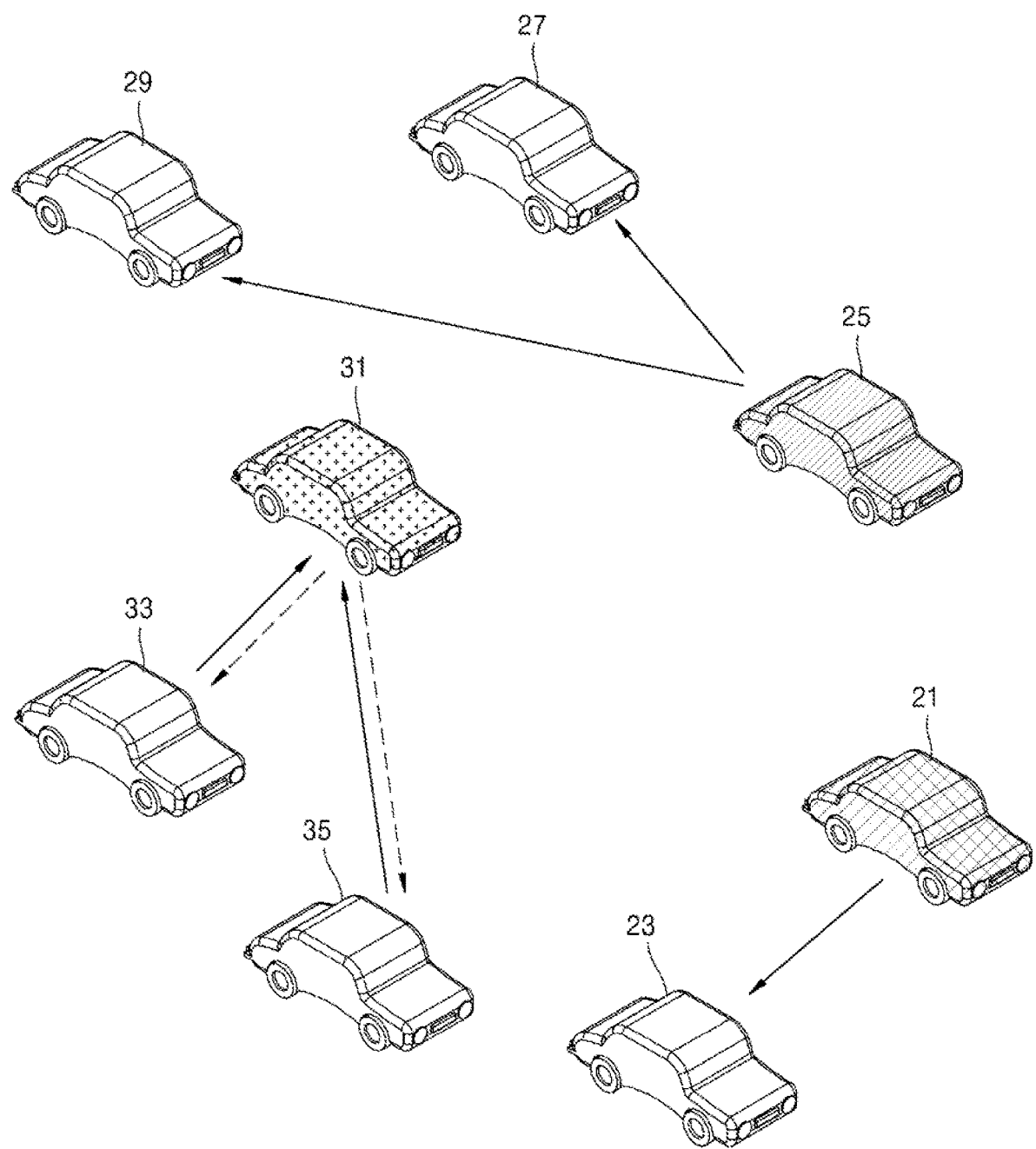
FIG. 1 is a view illustrating an example of a process of transmitting unicast, groupcast, and a physical sidelink feedback channel (PSFCH) through a sidelink between terminals according to an embodiment of the inventive concept.

Hereinafter, embodiments of the inventive concept will be described in detail with reference to the accompanying drawings in which like reference characters refer to like elements throughout.

Terms used in the current specification are for describing embodiments and are not for limiting the inventive concept. In the current specification, a singular form includes a plural form unless specially described. Described elements, processes, operations and/or elements do not exclude presence or addition of one or more other elements, processes, operations and/or elements.

Unless otherwise defined, all the terms (including technological and scientific terms) used in the current specification may be used in the meaning that may be commonly understood by those skilled in the art. In addition, terms defined in a commonly used dictionary are not ideologically or excessively interpreted unless specially defined.

In addition, in specifically describing the embodiments of the inventive concept, orthogonal frequency division multiplexing (OFDM) or an OFDM-based wireless communication system, in particular, the IEEE 802.11 standard is to be mainly described. However, embodiments may be modified and applied to other communication systems with a similar technological background and channel type (for example, a cellular communication system such as long term evolution (LTE), LTE-Advanced (LTE-A), new radio (NR), wireless broadband (WiBro), or global system for mobile communication (GSM) or a remote communication system such as Bluetooth or near field communication (NFC) without remarkably deviating from a range of the inventive concept by those skilled in the art.

Herein, "connects (combines)" and derivatives thereof refer to direct or indirect communication between two or more elements that physically contact or do not physically contact. The terms "transmits", "receives", and "communicates" and derivatives thereof include all direct and indirect communication. "Comprises" and/or "comprising" used in the specification mean inclusion without limit. "or" is a collective term meaning 'and/or'. "Is related to ~" and derivatives thereof mean includes, is included in ~, is connected to ~, implies, is implied in ~, is connected to ~, is combined with ~, may communicate with ~, cooperates with ~, interposes, puts in parallel, is close to ~, is bound to ~, has, has a feature of ~, and has a relation with ~. "A controller" means a certain device, system, or a part thereof controlling at least one operation. The controller may be implemented by hardware or a combination of hardware and software and/or firmware. A function related to a specific controller may be locally or remotely concentrated or dispersed.

FIG. 1 is a view illustrating an example of a process of transmitting unicast, groupcast, and a physical sidelink feedback channel (PSFCH) through a sidelink among terminals according to an embodiment of the inventive concept. First to eighth terminals 21, 23, 25, 27, 29, 31, 33, and 35 performing vehicle-to-everything (V2X) communication according to an embodiment of the inventive concept are illustrated as an example to facilitate understanding of concepts disclosed herein. Noted that the first to eight terminals 21-35 are exemplified as automobiles, but may be other types of mobile terminals in other examples.

In the example, communication between the first and second terminals 21 and 23 is one-to-one communication, that is, unicast communication, performed through sidelink. One to one communication may be unidirectional or bidirectional, as indicated by the opposite direction arrows. A signal exchange between the first and second terminals 21 and 23 through unicast may include processes of determining scrambling, control information mapping, data transmission, and a unique identification (ID) value by using a resource or a value engaged between the first and second terminals 21 and 23.

Communication among the third to fifth terminals 25, 27, and 29 in the example is groupcast communication in which the third terminal 25 transmits common data to the fourth and fifth terminals 27 and 29 in a group through sidelink. In the groupcast communication, terminals that are not included in the group may not receive signals transmitted by the third terminal 25 for the groupcast. Resource allocation for signal transmission may be determined by a base station (BS) or a terminal that functions as a leader in a group or may be selected by a terminal transmitting a signal.

Finally, communication among the sixth to eighth terminals 31, 33, and 35 is groupcast communication in which the seventh and eighth terminals 33 and 35 receive common data from the sixth terminal 31 (as indicated by the dotted arrows) and transmit information (solid arrows) on reception success or failure of the corresponding data to the sixth terminal 31 as feedback. Note that similar feedback may also be transmitted between terminals performing unicast communication (as indicated by the arrow from terminal 23 to terminal 21).

For example, the information on the reception success or failure of the corresponding data may be hybrid automatic repeat request (HARQ)-acknowledgement/negative-acknowledgement (ACK/NACK) information, which may be included in the PSFCH.

The above-described various types of communication may be performed among the first to eighth terminals 21, 23, 25, 27, 29, 31, 33, and 35 performing the V2X communication according to an embodiment of the inventive concept. Communication between vehicles and a fixed base station (BS) is also possible with V2X communication, as described below with reference to FIG. 2.

Figure 2:
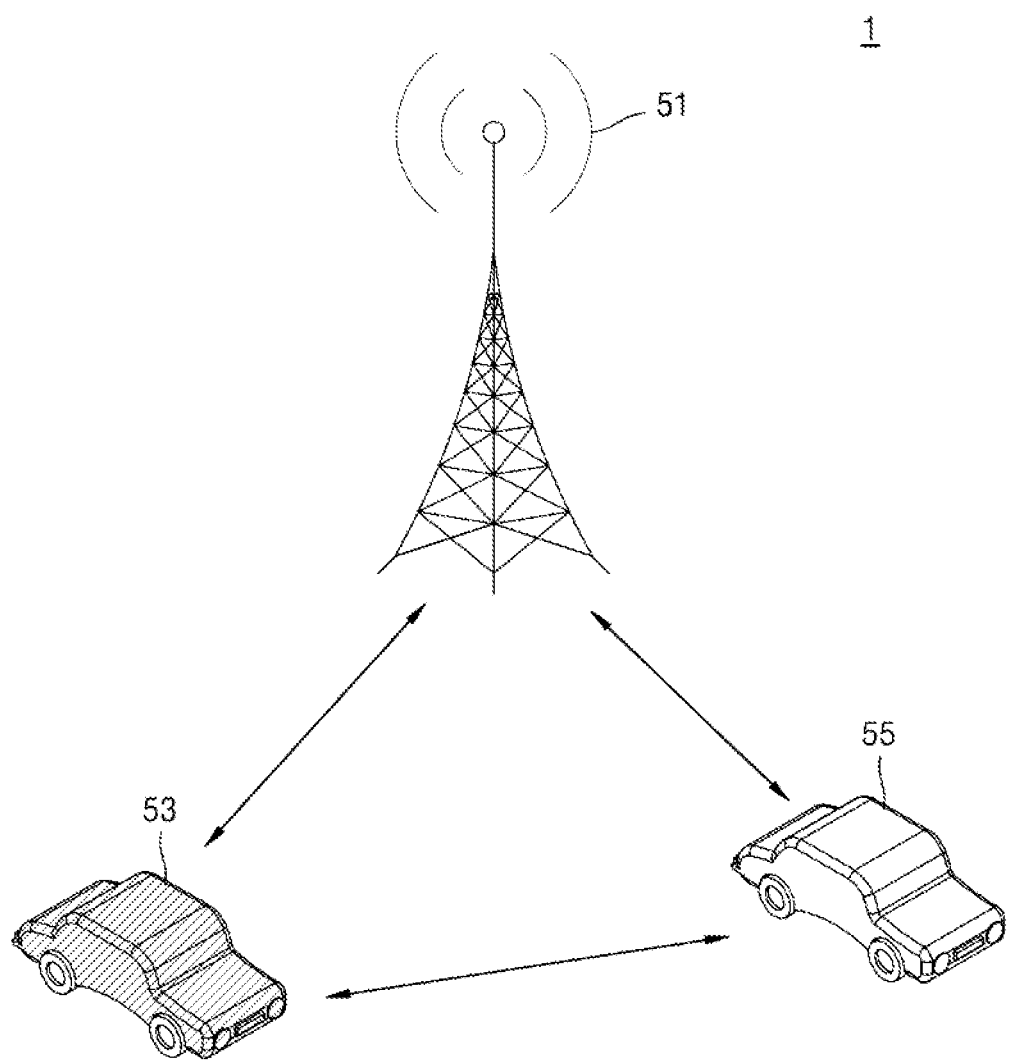
FIG. 2 is a view illustrating an example of a signaling process between a terminal and a base station (BS) and a channel transmitting and receiving process between terminals according to an embodiment of the inventive concept.

FIG. 2 is a view illustrating an example of a signaling process between a terminal and a BS and a channel transmitting and receiving process between terminals according to an embodiment of the inventive concept. A wireless communication system 1 according to an embodiment of the inventive concept may include a BS 51 and terminals 53 and 55. More or fewer terminals may communicate with the BS 51 in other examples.

Various channels and signals used in the NR V2X sidelink include:
- a physical sidelink control channel (PSSCH), for transmitting control information in the sidelink;
- a physical sidelink shared channel (PSSCH), for transmitting a data payload in the sidelink and may carry additional control information;
- a physical sidelink broadcast channel (PSBCH), for transmitting information for supporting synchronization in the sidelink;
- a physical sidelink feedback channel (PSFCH), for transmitting feedback related to a successful or a failed reception of a sidelink transmission;
- a demodulation reference signal (DMRS), which may be sent within an associated physical channel PSCCH, PSSCH or PSBCH and used by the receiving device for decoding the associated physical channel. For example, a DMRS channel associated with PSSCH may be called "PSSCH DMRS".

In relation to the NR V2X, a "TS38.214" standard document discloses that both PSSCH DMRS and PSCCH may be allocated to the same OFDM symbol under a specific condition. However, because the specific condition is vaguely described in generic terms, there may be various interpretations in accordance with the number of subchannels and sizes of the subchannels. Accordingly, performance issues may arise in conventional UEs designed to conform with the NR V2X protocol of TS38.214, since such UEs attempting to communicate with one another via sidelink may be incompatible. These drawbacks may be overcome in embodiments of the inventive concept, in which a UE's decision on whether to allocate PSSCH DMRS and PSCCH to the same OFDM symbol, is based on a number and size of subchannels.

With continuing reference to FIG. 2, if the wireless communication system 1 omits the BS 51 and thereby includes only the terminals 53 and 55, a leader terminal between the terminals 53 and 55 may generate scheduling information (e.g., sidelink control information (SCI) described later) without radio resource control (RRC) signaling of the BS. Because the leader terminal between the terminals 53 and 55 may perform a scheduling work for sidelink communication without the BS, it may be determined whether PSSCH DMRS and PSCCH are allocated to the same OFDM symbol, and a location in which second sidelink control information (SCI) starts to be allocated may be determined.

To facilitate understanding, an example is presented in which the wireless communication system 1 includes the terminals 53 and 55 and the BS 51, and the sidelink communication between the terminals 53 and 55 is scheduled through the RRC signaling of the BS 51. For example, in this case, the BS 51 may determine whether the PSSCH DMRS and the PSCCH are allocated to the same OFDM symbol and the location in which the 2nd SCI starts to be allocated.

The terminals 53 and 55 illustrated in FIG. 2 may perform the V2X communication (for example, the unicast communication, the groupcast communication, or the PSFCH transmission) illustrated in FIG. 1. Therefore, it is illustrated in FIG. 2 that the terminals 53 and 55 perform the unicast communication therebetween. However, it may be interpreted that partial terminals in a group performing the groupcast communication are illustrated.

In addition, the wireless communication system 1 may be, for example, a wireless communication system using a cellular network such as a new radio (NR) communication system, a long term evolution (LTE) communication system, an LTE-advanced communication system, a code division multiple access (CDMA) communication system, or a global system for mobile communications (GSM) communication system, a wireless local area network (WLAN) communication system, or another arbitrary wireless communication system.

Here, a wireless communication network (e.g., referred to as radio access technology (RAT)) used by the wireless communication system 1 may support communication among a plurality of wireless communication devices including the terminals 53 and 55 by sharing available network resources.

For example, in the wireless communication network, information may be transmitted by a multiple access method such as code division multiple access (CDMA), frequency division multiple access (FDMA), time division multiple access (TDMA), orthogonal frequency division multiple access (OFDMA), single carrier frequency division multiple access (SC-FDMA), OFDM-FDMA, OFDM-TDMA, or OFDM-CDMA.

For example, hereinafter, description will be made assuming that the wireless communication system 1 is an NR communication system. However, exemplary embodiments of the inventive concept are not limited thereto and may also be applied to previous and next generation wireless communication systems.

On the other hand, the BS 51 may commonly refer to a fixed station communicating with the terminals 53 and 55 and/or another BS and may exchange data and control information with the terminals 53 and 55 and/or another BS by communicating with the terminals 53 and 55 and/or another BS.

For example, the BS 51 may be referred to as a node B, an evolved-node B (eNB), a next generation node B (gNB), a sector, a site, a base transceiver system (BTS), an access point (AP), a relay node, a remote radio head (RRH), or a radio unit (RU).

In addition, according to an embodiment of the inventive concept, the BS 51 may be interpreted as collective meaning representing a partial area or function that a base station controller (BSC) in CDMA, the node B in wideband CDMA (WCDMA), the eNB in LTE, or gNB or a sector (site) in NR covers.

On the other hand, the terminals 53 and 55 may be immobile user devices or mobile vehicles or arbitrary devices transmitting and receiving the data and/or the control information to and from the BS 51 by communicating with the BS 51.

For example, each of the terminals 53 and 55 may be referred to as a wireless station (STA), a mobile station (MS), a mobile terminal (MT), a user terminal (UT), user equipment (UE), a subscriber station (SS), a wireless device, a handheld device, or a vehicle.

The BS 51 may be connected to the terminals 53 and 55 through a wireless channel and may provide various communication services to the terminals 53 and 55 through the connected wireless channel. All user traffic of the BS 51 may be served through a shared channel. In addition, the BS 51 may schedule the terminals 53 and 55 by collecting state information of the terminals 53 and 55 such as buffer states, available transmission power states, and channel states of the terminals 53 and 55.

The wireless communication system 1 may support beamforming technology through OFDM. In addition, the wireless communication system 1 may support adaptive modulation & coding (AMC) in which a modulation scheme and a channel coding rate are determined based on the channel states of the terminals 53 and 55.

For example, the wireless communication system 1 may transmit and receive a signal by using a wide frequency band provided in a frequency band of at least 6 GHz as well as a frequency band of less than 6 GHz.

For example, the wireless communication system 1 may increase a data transmission rate by using a millimeter wave band such as a 28 GHz band or a 60 GHz band.

In the millimeter wave band, an amount of signal attenuation per distance may be greater than in another band. Therefore, the wireless communication system 1 may support directional beam-based transmission and reception in order to secure coverage. Furthermore, the wireless communication system 1 may perform a beam sweeping operation for the directional beam-based transmission and reception.

Here, in the beam sweeping operation, the terminals 53 and 55 and the BS 51 determine a transmission beam and a reception beam of which directions are synchronized with each other by sequentially or randomly sweeping directional beams having predetermined patterns. A pattern of the transmission beam and a pattern of the reception beam of which directions are synchronized with each other may be determined as a pair of transmission and reception beam patterns. A beam pattern may be defined as a shape of a beam determined based on a width of a beam and a peak direction of the beam.

The terminals 53 and 55 and the BS 51 of the wireless communication system 1 may be configured and operate as described above. In the following discussion, examples of communication performed between the terminals 53 and 55 or between the terminals 53 and 55 and the BS 51 will be described in detail.

The terminals 53 and 55 may access the network of the wireless communication system 1 by transmitting and receiving signals to and from the BS 51 through uplink and downlink, respectively. A link (that is, a data transmission and reception interface) between the terminals 53 and 55 and the BS 51 may be referred to as a Uu link. Furthermore, to exchange various setting information items required for signal transmission and reception between the terminals 53 and 55 and the BS 51, RRC connection may be performed between the terminals 53 and 55 and the BS 51 and the RRC communication may be referred to as Uu-RRC.

The BS 51 may perform scheduling for signal transmission and reception (for example, transmission and reception of the PSSCH, the PSCCH, and the PSFCH) between the terminals 53 and 55 or may perform setting related to the groupcast (for example, selection of a leader in a group or setting of a size of a zone for the groupcast) by performing the RRC signaling on the terminals 53 and 55.

For example, the terminals 53 and 55 may receive scheduling information for sidelink communication through the RRC signaling from the BS 51 or a physical downlink control channel (PDCCH).

The terminals 53 and 55 may transmit and receive a signal through sidelink therebetween. The sidelink (that is, a data transmission and reception interface) between the terminals 53 and 55 may be referred to as a PC5 link. Furthermore, to exchange various setting information items utilized for signal transmission and reception between the terminals 53 and 55, RRC connection may be performed between the terminals 53 and 55 and may be referred to as PC5-RRC.

Here, a channel transmitted and received through the sidelink may be, for example, the PSCCH, the PSSCH, the PSBCH broadcast together with a synchronizing signal, or the PSFCH for transmitting feedback.

For simplicity of explanation, hereinafter, the terminal 53 performing data transmission in the sidelink may be referred to as a transmission terminal and the terminal 55 performing data reception in the sidelink may be referred to as a reception terminal. The transmission terminal and the reception terminal may respectively perform the data transmission and the data reception in the sidelink.

The terminal 53 may generate sidelink scheduling information (SCI) based on the scheduling information received from the BS 51. The terminal 53 may transmit the generated SCI to the terminal 55 through the PSCCH.

Here, the SCI may be transmitted to the terminal 55 in the form of a single SCI or may be divided into two SCI items to be transmitted to the terminal 55. For example, a method in which the SCI is divided into two SCI items to be transmitted to the terminal 55 may be referred to as 2-stage SCI (or 2-stage PSCCH).

The terminal 53 may transmit the PSSCH to the reception terminal 55 based on the SCI. The terminal 55 may transmit the PSFCH including the information on the reception success or failure of the PSSCH transmitted by the terminal 53 (that is, the HARQ-ACK/NACK information) to the terminal 53. Therefore, the terminal 53 may determine the HARQ ACK/NACK in the PSFCH received from the terminal 55 and may determine whether to retransmit the PSSCH based on the determination result.

Various signal or channel transmission and reception operations performed between the terminals 53 and 55 and the BS 51 will be described in detail later.

As described above, because the wireless communication system 1 according to an embodiment of the inventive concept may have the above-described characteristics and configuration, hereinafter, with reference to FIGS. 3 to 5, according to an embodiment of the inventive concept, a structure of the time-frequency domain applied to the sidelink of the NR communication system will be described.

Figure 3:
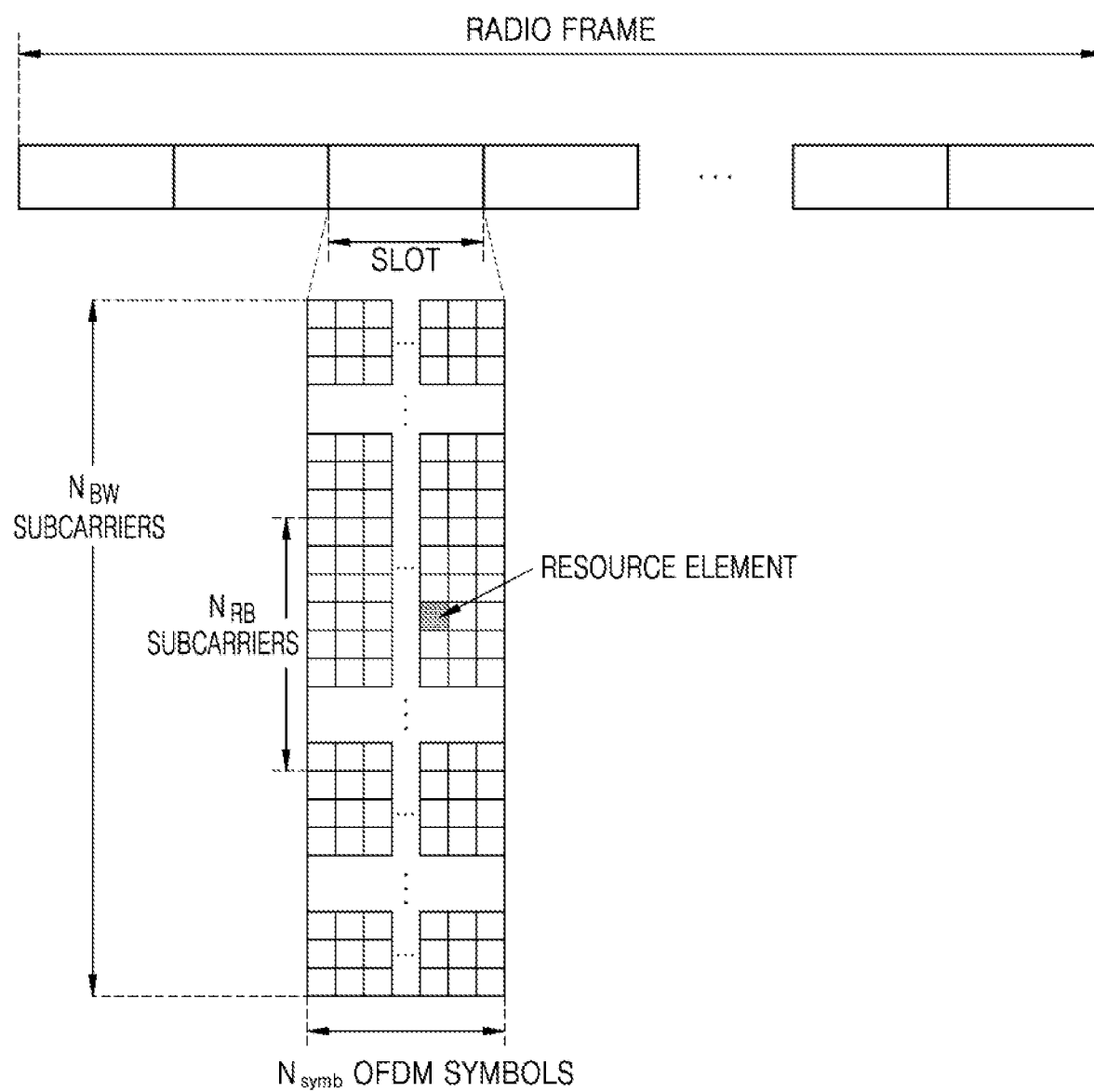
Figure 5:
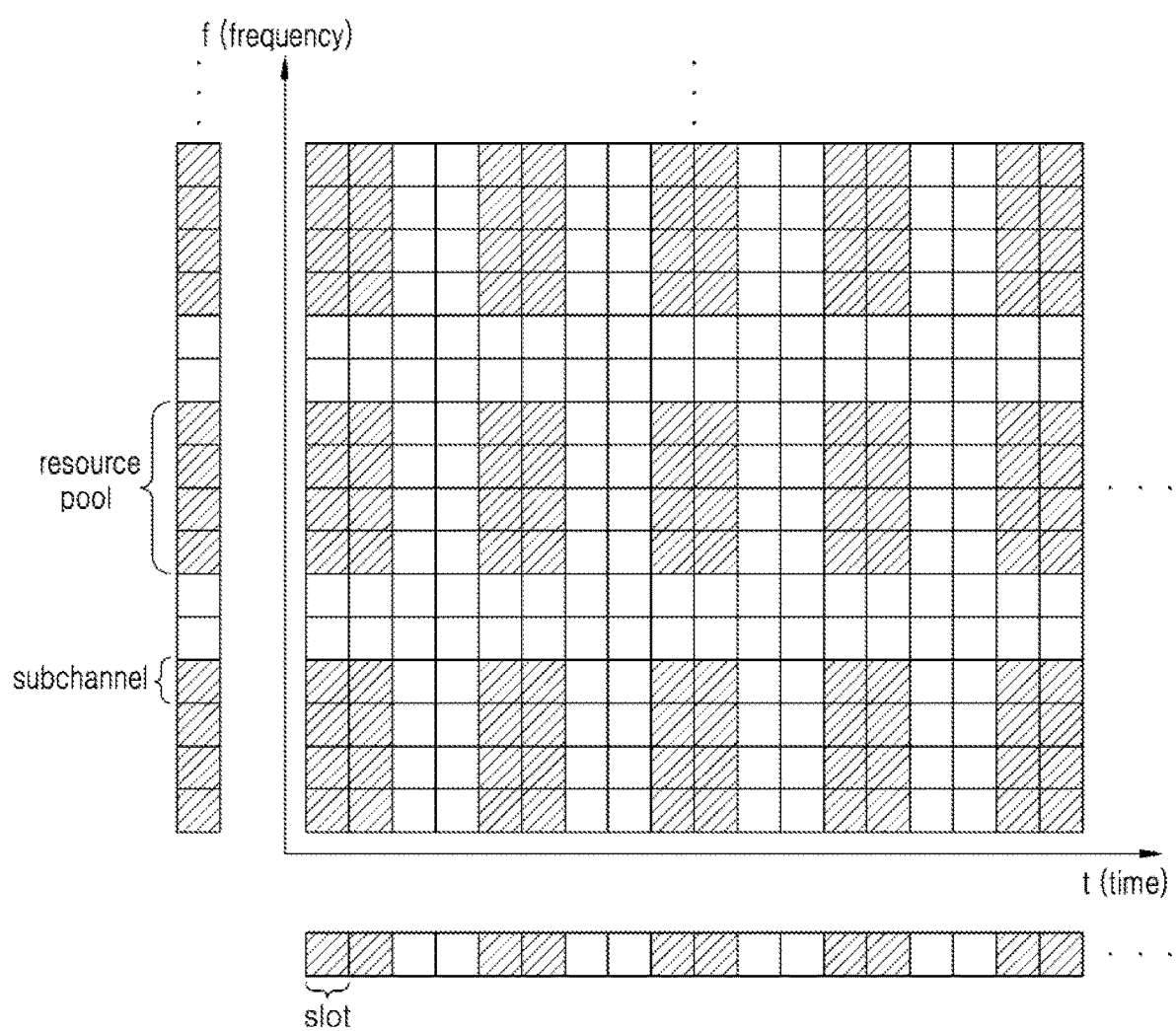

For example, the structure of the time-frequency domain illustrated in FIGS. 3 to 5 is only an example of the time-frequency domain applied to an embodiment of the inventive concept and the inventive concept is not limited thereto. For convenience of description, the structure of the time-frequency domain illustrated in FIGS. 3 to 5 will be taken as an example.

First, referring to FIG. 3, the horizontal axis represents the time domain and the vertical axis represents the frequency domain. A basic unit in the time domain is an OFDM symbol, and Nsymb OFDM symbols may configure one slot. A length of a subframe may be defined as 1.0 ms, and a radio frame may be defined as 10 ms. A basic unit in the frequency domain is a subcarrier, and a bandwidth of a system transmission band may include $N_{BW}$ subcarriers.

In the time-frequency domain, a basic unit of a resource is a resource element (RE) and may be represented by an OFDM symbol index and a subcarrier index. A resource block (RB) or a physical resource block (PRB) may be defined by $N_{RB}$ (e.g., 12) continuous subcarriers in the frequency domain. Thus, the one RB may be defined by the $N_{RB}$ subcarriers.

For example, a minimum transmission unit of data may be commonly RB. In the NR communication system, in general, Nsymb is at least one, $N_{RB}$ is 12, and $N_{BW}$ and $N_{RB}$ may be proportionate to the bandwidth of the system transmission band. In addition, a data rate may increase in proportion to the number of RBs scheduled to a terminal.

A channel bandwidth represents a radio frequency (RF) bandwidth corresponding to the system transmission bandwidth. For example, in the NR communication system having the channel bandwidth of 100 MHz with a subcarrier width of 30 kHz, the system transmission bandwidth may include 273 RBs.

Based on the above content, referring to FIGS. 4 and 5, in Rel-16 NR V2X, a subchannel and a resource pool defined in order to improve resource use efficiency are illustrated. For example, in FIG. 4, an example of a basic frame structure (that is, a structure of a time-frequency domain) of NR V2X is illustrated and 2-stage SCI is also illustrated. In FIG. 5, the resource pool is illustrated.

For instance, in the NR V2X, one slot includes a single resource pool or a plurality of resource pools and the resource pool may include a plurality of subchannels. Here, a size of the subchannel may be, for example, one of 10 RB, 15 RB, 20 RB, 25 RB, 50 RB, 75 RB, and 100 RB or may be one of 4 RB, 5 RB, and 6 RB.

A $0^{th}$ symbol (symbol 0) of the slot may be for automatic gain control (AGC) training.

In addition, in a $12^{th}$ symbol (symbol 12) of the slot, the PSFCH for determining whether the PSSCH is normal may be allocated and transmitted and transmission timing may be two or three slots after the slot in which the PSSCH is transmitted. For example, when the PSSCH is transmitted in an Ath slot, the PSFCH for the corresponding PSSCH may be transmitted in an (A+2)th or (A+3)th slot.

For example, the PSFCH may include 1 PRB (or 1 RB) and may be transmitted in each subchannel. In addition, transmission and reception periodicity may be set for each PSFCH and a minimum value of the transmission and reception periodicity may be defined as 1 (a slot unit). Because a plurality of PSFCHs may use the same resource, up to six cyclic shifts may be applied to different PSFCHs transmitted to the same RB. Therefore, for example, in the NR communication system having the channel bandwidth of 100 MHz with the subcarrier width of 30 kHz, up to $$\left(\frac{273 \ PRB}{4PRB/\text{subchannel}} * 6 \text{ cyclic shift pairs/subchannel}\right) \approx 410$$

PSFCHs may be transmitted per slot.

On the other hand, in a symbol (e.g., symbol 11) immediately before the PSFCH, AGC for receiving the PSFCH may be allocated, which is, because transmission subjects (for example, transmission terminals) of $0^{th}$ to $9^{th}$ symbols (symbols 0 to 9) are different from transmission subjects (for example, reception terminals) of $11^{th}$ and $12^{th}$ symbols (symbols 11 and 12), the AGC for the PSFCH may be.

In addition, a guard symbol may be allocated to 10th and 13th symbols (symbols 10 and 13) in order to guarantee guard time for timing advance. Because the transmission subjects of the $0^{th}$ to $9^{th}$ symbols (symbols 0 to 9) are different from the transmission subjects of the $11^{th}$ and 12th symbols so that a reception may be out of symbol timing, the guard symbol may be required.

To the $1^{st}$ to $9^{th}$ symbols (symbols 1 to 9) other than the above channel, a demodulation reference signal (DMRS) (the DMRS illustrated in the drawing is for the PSSCH), the PSCCH, and the PSSCH may be allocated. Furthermore, the PSFCH, the AGC, and the guard symbol may be allocated to the $1^{st}$ to $9^{th}$ symbols (symbols 1 to 9). However, according to an embodiment of the inventive concept, for convenience of description, it is taken as an example that the PSFCH, the AGC, and the guard symbol are allocated to the 10th to 13th symbols.

For example, because the SCI is transmitted through the 2-stage in the NR V2X, the $1^{st}$ SCI may be allocated to an original PSCCH scheduling area and the $2^{nd}$ SCI may be allocated to a PSSCH scheduling area.

In more detail, the $1^{st}$ SCI may be provided from the lowest RB (for example RB #0 of subchannel #0) of the PSCCH in a subchannel. The $1^{st}$ SCI may include allocation information (for example, frequency domain resource allocation (FDRA) and time domain resource allocation (TDRA)) of the PSSCH and allocation information of the $2^{nd}$ SCI. The $2^{nd}$ SCI may be allocated from the lowest RE (that is, sc #1 (sc means a subcarrier)) excluding RE for the DMRS from the first DMRS symbol (DMRS of symbol 1) of the PSSCH. The $2^{nd}$ SCI may include information required for decoding the PSSCH.

For example, FIG. 4 illustrates that a size of one subchannel is 15 PRBs. However, in accordance with the inventive concept, a size of one subchannel may be at least 20 PRBs. In the TS38.214 standard document, a condition under which the PSSCH DMRS and the PSCCH are allocated to the same OFDM symbol is defined as follows.

<TS38.214, 16.2.0 Ver. Section 8.2.2>

If PSSCH DMRS and PSCCH are mapped to the same OFDM symbol, then this mapping within a single sub-channel is only supported if higher layer parameter subchannelsize >=20, i.e. the sub-channel size is at least 20 PRBs.

Under the above condition, the PSSCH DMRS may not be allocated to an entire subcarrier corresponding to the corresponding OFDM symbol and may be allocated only to the remaining subcarrier excluding the PSCCH area. Therefore, the number of PSSCH DMRSs that may be used during a channel estimation may be insufficient and, due to the insufficient PSSCH DMRSs, the performance of the channel estimation may be limited. Therefore, in the above standard document, in order to secure minimal channel estimation performance, it is prescribed that, only when the size of the subchannel is at least 20 PRBs, the above mapping (that is, allocating the PSSCH DMRS and the PSCCH to the same OFDM symbol) may be performed.

However, when devices are designed to strictly adhere to the standard document, in accordance with the number and sizes of subchannels, a determination on whether the mapping may be performed may be variously interpreted, which may cause erroneous mapping and/or incompatibility among devices, leading to a failure to communicate. According to an embodiment of the inventive concept, however, the mapping is performed when certain predetermined conditions are met, which will be described in detail later.

As described above, the time-frequency domain applied to the sidelink of the NR communication system may be configured according to an embodiment of the inventive concept. Hereinafter, referring to FIGS. 6 and 7, a configuration of a radio frequency (RF) transceiver of a terminal or a BS according to an embodiment of the inventive concept will be described.

Figure 6:
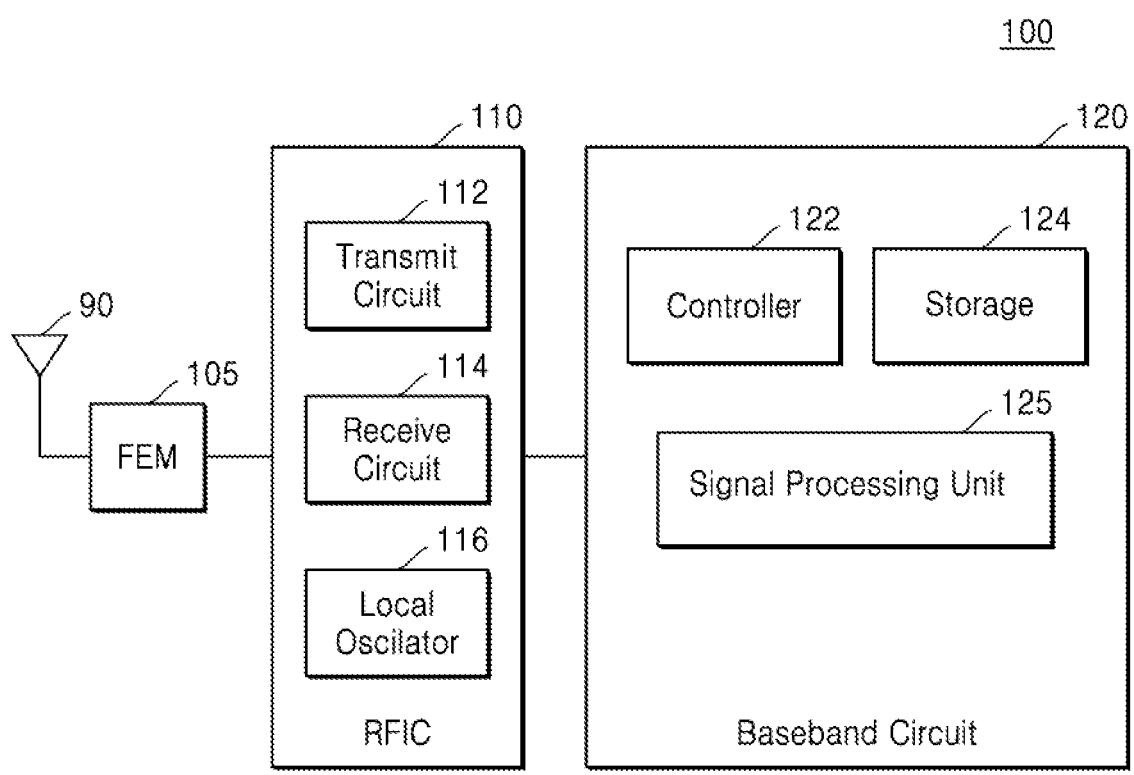
FIG. 6 is a block diagram illustrating a radio frequency (RF) transmitting and receiving circuitry included in a terminal or a BS according to an embodiment of the inventive concept.

FIG. 6 is a block diagram illustrating RF transmitting and receiving circuitry 100 included in a terminal or a BS according to an embodiment of the inventive concept. FIG.

7 is a block diagram schematically illustrating an example of the RF transmitting and receiving circuitry 100 of FIG. 6.

Figure 7:
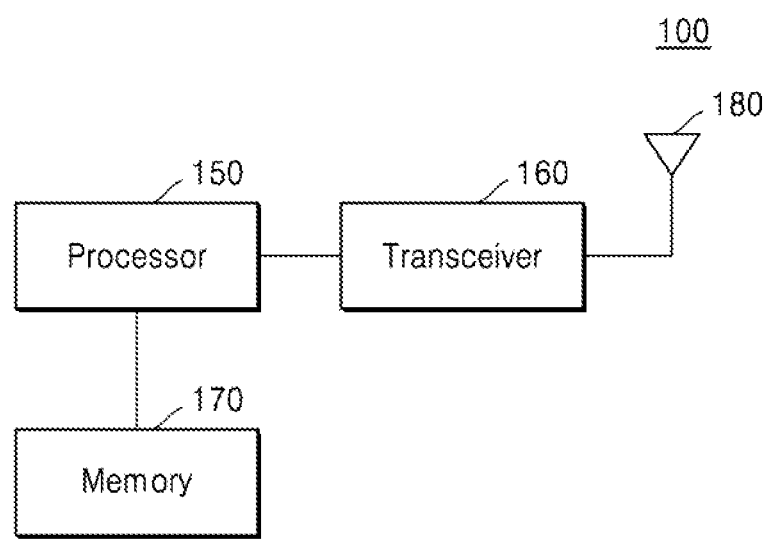
FIG. 7 is a block diagram schematically illustrating an example of the RF transmitting and receiving circuitry of FIG. 6.

For example, the RF transmitting and receiving circuitry 100 of FIGS. 6 and 7 may be included in the terminal 53 or 55 or the BS 51 of FIG. 2. That is, the RF transmitting and receiving circuitry 100 of FIGS. 6 and 7 may be included in one of the terminals 53 and 55 and the BS 51 illustrated in FIG. 2 and may be applied to, for example, a computer, a smartphone, a portable electronic device, a tablet, a wearable device, or a sensor used for Internet of things.

First, referring to FIG. 6, the RF transmitting and receiving circuitry 100 may include an antenna 90, a front-end module 105, a radio frequency integrated circuit (RFIC) 110, and a baseband circuit 120. In addition, although not shown in FIG. 6, the RF transmitting and receiving circuitry 100 may further include a power modulator supplying a power voltage (for example, a dynamically variable output voltage) to a power amplifier in the RFIC 110. The power modulator may be driven in an average power tracking mode or an envelope tracking mode in order to generate and output the power voltage.

For example, the front-end module 105 and the RFIC 110 may be implemented in one chip as a single element. In this case, a function of the front-end module 105 and a function of the RFIC 110 may be implemented in one chip. For convenience of description, according to an embodiment of the inventive concept, FIG. 6 illustrates the front-end module 105 and the RFIC 110 provided as separate elements.

First, the antenna 90 may be connected to the front-end module 105 and may transmit a signal received from the front-end module 105 to another wireless communication device (a terminal or a BS) or may provide a signal received from another wireless communication device to the front-end module 105. The front-end module 105 may be connected to the antenna 90 and may separate a transmission frequency from a reception frequency. That is, the front-end module 105 may divide the signal received from the RFIC 110 by frequency band and may provide the divided signal to the antenna 90. In addition, the front-end module 105 may provide the signal received from the antenna 90 to the RFIC 110.

As described above, the antenna 90 may transmit the signal frequency divided by the front-end module 105 to the outside or may provide the signal received from the outside to the front-end module 105.

The antenna 90 may be an array antenna or other type of antenna. The antenna 90 may be singular or plural. Therefore, in some embodiments, the RF transmitting and receiving circuitry 100 may support phased array and multiple-input and multiple-output (MIMO) by using a plurality of antennas. In FIG. 6, for convenience of description, only one antenna is illustrated.

The front-end module 105 may include an antenna tuner. The antenna tuner (not shown) may be connected to the antenna 90 and may control impedance of the antenna 90.

The RFIC 110 may generate an RF signal by performing frequency up-conversion on a baseband signal received from the baseband circuit 120. The RFIC 110 may generate the baseband signal by performing frequency down-conversion on the RF signal received from the front-end module 105.

For instance, the RFIC 110 may include a transmit circuit 112 for the frequency up-conversion, a receive circuit 114 for the frequency down-conversion, and a local oscillator 116.

For example, although not shown in FIG. 6, the transmit circuit 112 may include a first analog baseband filter, a first mixer, and a power amplifier. The receive circuit 114 may include a second analog baseband filter, a second mixer, and a low-noise amplifier.

Here, the first analog baseband filter may filter the baseband signal received from the baseband circuit 120 and may provide the filtered baseband signal to the first mixer. The first mixer may perform the frequency up-conversion of converting a frequency of the baseband signal from a baseband into a high frequency band in accordance with a frequency of a signal provided by the local oscillator 116. Through the frequency up-conversion, the baseband signal may be provided to the power amplifier (not shown) as the RF signal and the power amplifier may amplify the RF signal and may provide the amplified RF signal to the front-end module 105.

The low-noise amplifier may amplify the RF signal received from the front-end module 105 and may provide the amplified RF signal to the second mixer. The second mixer may perform the frequency down-conversion of converting the frequency of the RF signal from the high frequency band into the baseband in accordance with the frequency of the signal provided by the local oscillator 116. Through the frequency down-conversion, the RF signal may be provided to the second analog baseband filter as the baseband signal and the second analog baseband filter may filter the baseband signal and may provide the filtered baseband signal to the baseband circuit 120.

On the other hand, the baseband circuit 120 may receive the baseband signal from the RFIC 110 and may process the received baseband signal or may generate the baseband signal and may provide the generated baseband signal to the RFIC 110.

In addition, the baseband circuit 120 may include a controller 122, a storage 124, and a signal processing unit 125.

For instance, the controller 122 may control overall operations of the RFIC 110 as well as the baseband circuit 120. In addition, the controller 122 may write or read data in or from the storage 124. For this, the controller 122 may include at least one processor, microprocessor, or microcontroller or may be a part of the processor. For instance, the controller 122 may include a central processing unit (CPU) and a digital signal processor (DSP).

The storage 124 may store data such as a basic program, an application program, and setting information for an operation of the RF transmitting and receiving circuitry 100. For example, the storage 124 may store instructions and/or data related to the controller 122, the signal processing unit 125, or the RFIC 110.

The storage 124 may include various storage media. That is, the storage 124 may include volatile memory, non-volatile memory, or a combination of the volatile memory and the non-volatile memory and, for example, random access memory (RAM) such as dynamic RAM (DRAM), phase-change RAM (PRAM), magnetic RAM (MRAM), or static RAM (SRAM) or flash memory such as NAND flash memory, NOR flash memory, or ONE NAND flash memory.

In addition, the storage 124 may store various processor-executable instructions. The processor-executable instructions may be executed by the controller 122.

The signal processing unit 125 may process the baseband signal received from the RFIC 110 or the baseband signal to be provided to the RFIC 110.

For example, for convenience of description, the signal processing unit 125 will be described based on components in a receiving path.

For instance, the signal processing unit (interchangeably, "signal processor" or "signal processing circuitry") 125 may include a demodulator, a receive filter and cell searcher, and other processing circuitry ("processing blocks").

First, the demodulator may include a channel estimator, a data deallocation unit, an interference whitener, a symbol detector, a channel state information (CSI) generator, a mobility measurement unit, an automatic gain control unit, an automatic frequency control unit, a symbol timing recovery unit, a delay spread estimation unit, and a time correlator and may perform functions of the above elements.

Here, the mobility measurement unit for measuring signal quality of a serving cell and/or a neighbor cell to support mobility may measure a received signal strength indicator (RSSI), reference signal received power (RSRP), reference signal received quality (RSRQ), and a reference signal (RS)-signal-to-interference and noise ratio (SINR) of a cell.

For example, although not shown in FIG. 6, the demodulator may include a plurality of sub-demodulators independently or jointly performing the above-described functions on dispreading signals or signals of the respective frequency bands in a $2^{nd}$ generation (2G) communication system, a $3^{rd}$ generation (3G) communication system, a $4^{th}$ generation (4G) communication system, and a $5^{th}$ generation (5G) communication system.

Then, the receive filter and cell searcher may include a receive filter, a cell searcher, a fast Fourier transform (FFT) unit, a time duplex-automatic gain control (TD-AGC) unit, and a time duplex-automatic frequency control (TD-AFC) unit.

Here, the receive filter (referred to as a receive front end) may perform sampling, interference whitening, and amplification on the baseband signal received from the RFIC 110. The cell searcher includes a primary synchronization signal (PSS) detector and a secondary synchronization signal (SSS) detector and may measure a magnitude and quality of a neighboring cell signal.

The other processing blocks may include a symbol processor, a channel decoder, and an uplink processor.

Here, the symbol processor may perform channel-deinterleaving, demultiplexing, and rate-matching so that the demodulated signal may be decoded by channel. The channel decoder may decode the demodulated signal in units of code blocks.

For example, the symbol processor and the channel decoder may include a hybrid automatic repeat request (HARQ) processing unit, a turbo decoder, a cyclic redundancy check (CRC) checker, a viterbi decoder, and a turbo encoder.

The uplink processor generating a transmit baseband signal may include a signal generator, a signal allocator, an inverse fast Fourier transform (IFFT) unit, a discrete Fourier transform (DFT) unit, and a transmit front end.

Here, the signal generator may generate a physical uplink shared channel (PUSCH), a physical uplink control channel (PUCCH), and a physical random access channel (PRACH). The transmit front end may perform interference whitening and digital mixing on the transmit baseband signal.

For example, the other processing blocks may include a sidelink processor, which may generate the PSSCH, the PSCCH, and the PSFCH.

The sidelink processor may not be separately provided, such that an integrated processor in which the sidelink processor is integrated with the uplink processor may be provided. In this case, the corresponding integrated processor may process all the uplink and sidelink-related operations. For convenience of description, an example is presented in which the sidelink processor separate from the uplink processor is provided.

As described above, the signal processing unit 125 may have the above-described configuration and characteristics. Configurations or functions of the demodulator, the receive filter and cell searcher, and the other parts in the signal processing unit 125 may differ in other embodiments. For example, the channel estimator in the demodulator may be included in the receiver filter and cell searcher or the other processing blocks and the FFT unit in the receiver filter and cell searcher may be included in the demodulator or the other processing blocks. In addition, the channel decoder in the other processing blocks may be included in the demodulator or the receive filter and cell searcher. For convenience of description, according to an embodiment of the inventive concept, it is taken as an example that the configurations or functions of the demodulator, the receive filter and cell searcher, and the other processing blocks in the signal processing unit 125 are implemented as described above.

As described above, in FIG. 6, the baseband circuit 120 is illustrated as including the controller 122, the storage 124, and the signal processing unit 125.

However, in the baseband circuit 120, at least two of the controller 122, the storage 124, and the signal processing unit 125 may be integrated with each other. The baseband unit 120 may further include other elements than the above-described elements or may not include some elements. Furthermore, the signal processing unit 125 may further include other elements than the above-described elements or may not include some elements.

According to an embodiment of the inventive concept, for convenience of description, it is taken as an example that the baseband circuit 120 includes the above-described components.

In some embodiments, the controller 122, the storage 124, and the signal processing unit 125 may be included in one device. In other embodiments, the controller 122, the storage 124, and the signal processing unit 125 may be distributed to different devices (for example, distributed architectures).

The RF transmitting and receiving circuitry 100 of FIG. 6 configured as described above may be included in the terminal 53 or 55 or the BS 51 of FIG. 2.

The RFIC 110 and the baseband circuit 120 may include parts well known to those skilled in the art as illustrated in FIG. 6. The corresponding parts may be executed by a method well known to those skilled in the art and may be executed by using hardware, firmware, software logic, or a combination of hardware, firmware, and software logic.

FIG. 6 illustrates only an example of the RF transmitting and receiving circuitry 100 of FIG. 6 and the inventive concept is not limited thereto. Various modifications (for example, addition or deletion of the parts) may be made to the embodiment of FIG. 6.

Here, referring to FIG. 7, an example in which the configuration of the RF transmitting and receiving circuitry of FIG. 6 is partially changed (that is, simplified) is illustrated.

For instance, the RF transmitting and receiving circuitry 100 may include a processor 150, a transceiver 160, memory 170, and an antenna 180.

The processor 150 may control overall operations of the transceiver 160 and may write or read data in or from the memory 170. That is, the processor 150 may include, for example, a function of the controller 122 of FIG. 6.

The transceiver 160 may transmit and receive a wireless signal and may be controlled by the processor 150.

For instance, the transceiver 160 may generate the SCI. The transceiver 160 may transmit the generated SCI to the reception terminal through the PSCCH in the form of the single SCI or through the PSCCH and PSSCH in the form of the 2-stage SCI as described above.

On the other hand, the transceiver 160 may receive the SCI from the transmission terminal through the PSCCH and PSSCH in the form of the single SCI or in the form of the 2-stage SCI. In addition, the transceiver 160 may decode the PSSCH based on the received SCI.

For example, the transceiver 160 may include functions of the front-end module 105, the RFIC 110, and the signal processing unit 125 of FIG. 6. In this case, the signal processing unit 125 may generate or decode the SCI and the RFIC 110 and the front-end module 105 may transmit the generated SCI to the reception terminal or may receive the generated SCI from the transmission terminal. However, the inventive concept is not limited thereto.

The SCI transmitted by the transceiver 160 may be finally transmitted to the reception terminal through the antenna 180. The SCI received by the transceiver 160 may be previously received from the transmission terminal through the antenna 180.

The memory 170 may store the data such as the basic program, the application program, and the setting information for the operation of the RF transmitting and receiving circuitry 100. Therefore, the memory 170 may store instructions and/or data related to the processor 150 and the transceiver 160. That is, the memory 170 may include, for example, a function of the storage 124 of FIG. 6.

The antenna 180 may be connected to the transceiver 160 and may transmit the signal received from the transceiver 160 to another wireless communication device (for example, another terminal or BS) or may provide the signal received from another wireless communication device to the transceiver 160. That is, the antenna 180 may include, for example, a function of the antenna 90 of FIG. 6.

Meanwhile, although it has been described that the transceiver 160 generates the SCI in the embodiments of FIG. 7, the embodiments of the inventive concept may be implemented in various ways. For example, the processor 150 may generate the SCI and provide the generated SCI to the transceiver 160 according to embodiments of the inventive concept. In addition, the transceiver 160 may transmit the SCI to the reception terminal through the PSCCH and the PSSCH.

According to an embodiment of the inventive concept, the RF transmitting and receiving circuitry 100 included in the terminal 53 or 55 or the BS 51 has the above-described characteristics and configuration. Hereinafter, with reference to FIGS. 8 to 15, a method of determining whether to allocate the PSSCH DMRS and the PSCCH to the same OFDM symbol according to an embodiment of the inventive concept will be described in detail.

FIG. 8 is a table illustrating the method of determining whether to allocate the PSSCH DMRS and the PSCCH to the same OFDM symbol. FIGS. 9 to 15 are views illustrating the various PSSCH DMRS mapping cases of FIG. 8.

For example, FIGS. 8 to 15 will be described with reference to FIGS. 2 and 7. Hereinafter, for convenience of description, it is taken as an example that the PSCCH is allocated to two OFDM symbols (for example, first and second OFDM symbols). In addition, hereinafter, description will be made assuming that the PSSCH DMRS may be arranged in a symbol different from those of examples of the respective cases and, when the PSSCH DMRS is arranged in a plurality of symbols, intervals among the corresponding symbols may be different from those of the examples.

Referring to FIG. 8, the table illustrating the method of determining whether to allocate the PSSCH DMRS and the PSCCH to the same OFDM symbol according to an embodiment of the inventive concept is illustrated.

For instance, a decision on whether to allocate the PSSCH DMRS and the PSCCH to the same OFDM symbol may be made based on the number and sizes of subchannels.

Figure 9:
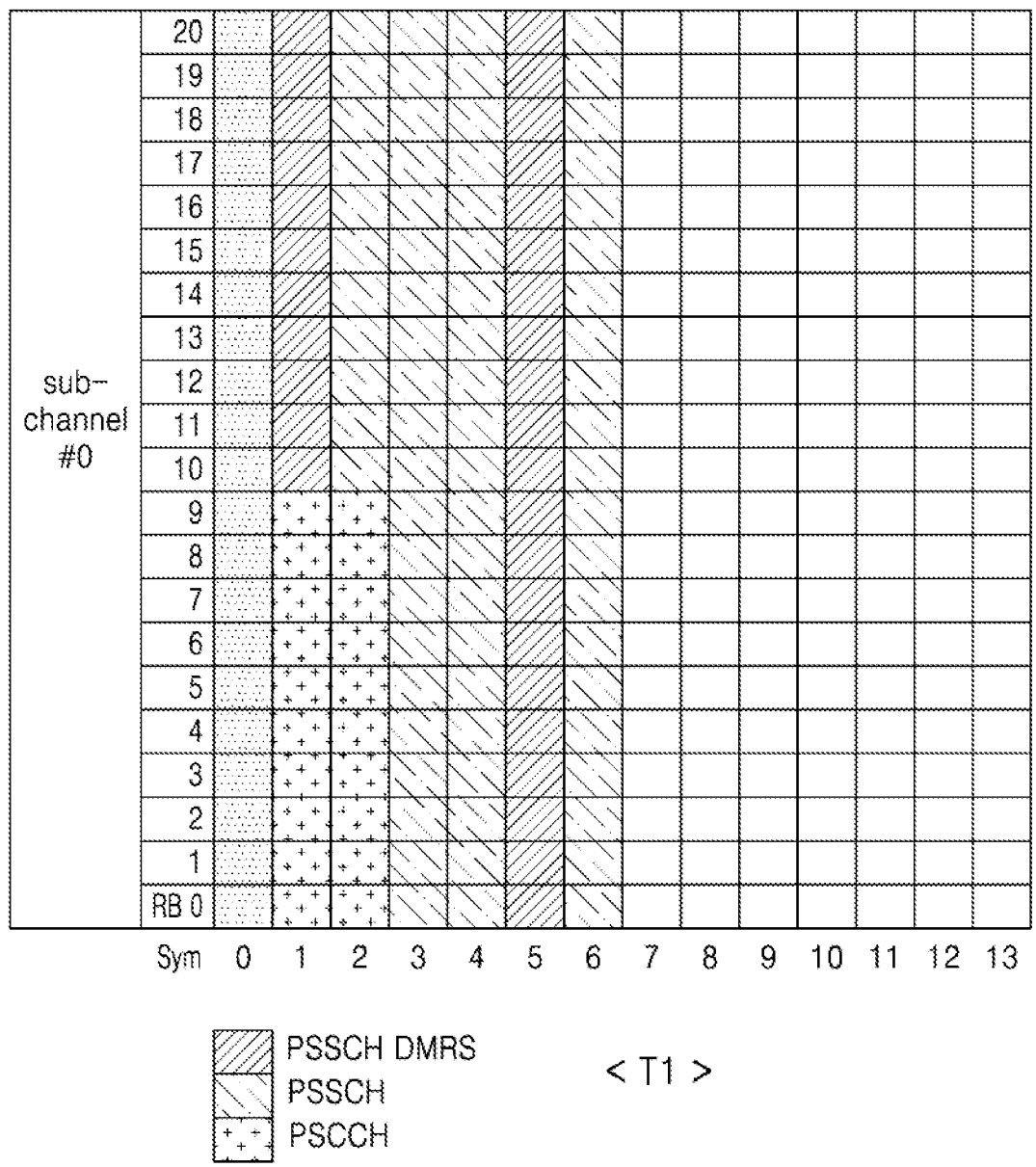
FIGS. 9, 10, 11, 12, 13, 14 and 15 are views illustrating respective PSSCH DMRS mapping cases of FIG. 8.

First, a case 'T1' will be described with reference to FIGS. 8 and 9. When the number of subchannels is 1 and a size of the subchannel is at least 20 physical resource blocks (PRBs), the DMRS of the PSSCH and the PSCCH may be allocated to the same OFDM symbol.

That is, in the case 'T1', the DMRS of the PSSCH and the PSCCH may be multiplexed to the same OFDM symbol.

For example, the case 'T1' may be stated in 'section 8.2.2' of the above-described TS38.214 (16.2.0 ver.) standard document.

Then, a case 'T2' will be described with reference to FIGS. 8 and 9. When the number of subchannels is 1 and a size of the subchannel is less than 20 PRBs, the DMRS of the PSSCH and the PSCCH may be allocated to different OFDM symbols and the number of OFDM symbols to which the DMRS of the PSSCH is allocated may be at least two.

That is, in the case 'T2', the DMRS of the PSSCH and the PSCCH may not be multiplexed to the same OFDM symbol.

Figure 10:
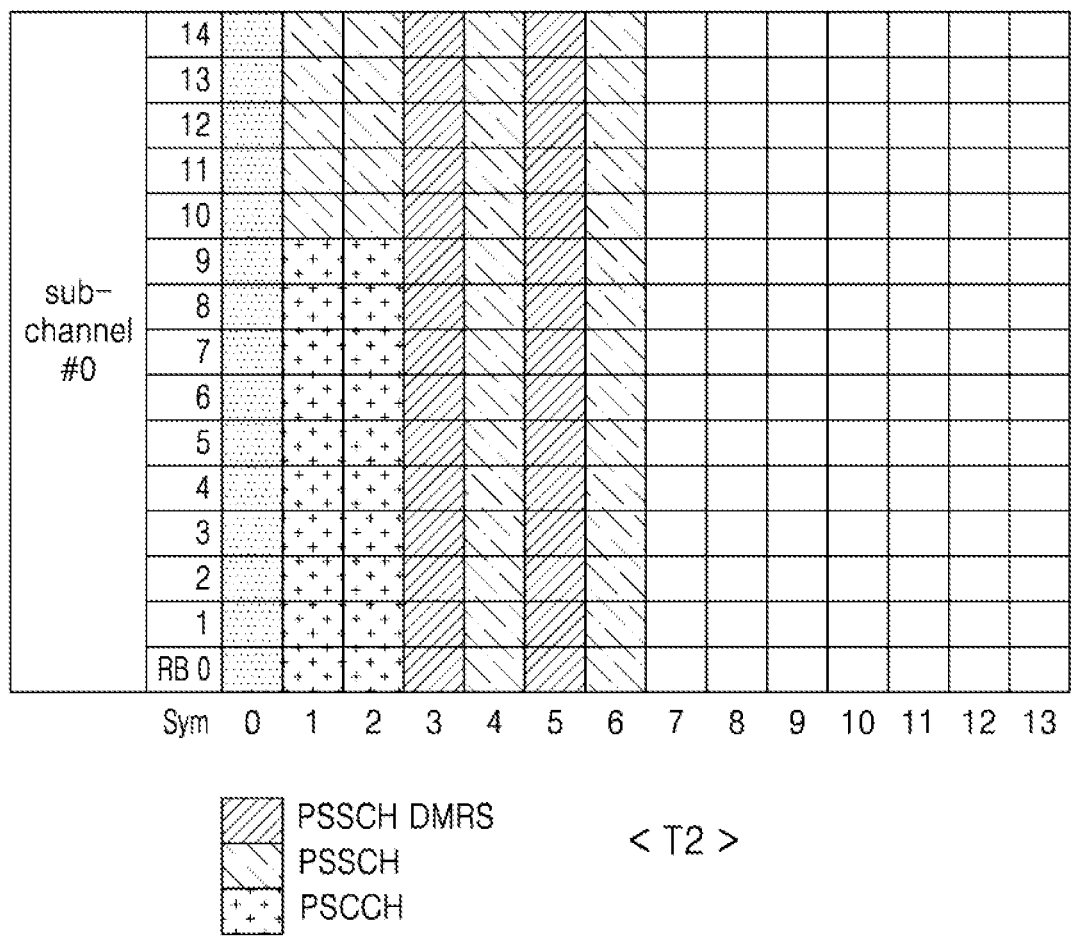

Therefore, as illustrated in FIG. 10, for example, when the PSCCH is allocated to first and second symbols, the DMRS of the PSSCH may be allocated to third and fifth symbols different from those of the PSCCH. The DMRS of the PSSCH may be allocated to symbols different from those illustrated in FIG. 10 or to at least three symbols.

For convenience of description, according to an embodiment of the inventive concept, it is taken as an example that, in the case 'T2', the DMRS of the PSSCH and the PSCCH are respectively allocated to the symbols illustrated in FIG. 10.

Then, a case 'T3' will be described with reference to FIGS. 8 and 11. When the number of subchannels is 1 and a size of the subchannel is less than 20 PRBs, the DMRS of the PSSCH and the PSCCH may be allocated to different OFDM symbols and the number of OFDM symbols to which the DMRS of the PSSCH is allocated may be 1.

That is, in the case 'T3', the DMRS of the PSSCH and the PSCCH may not be multiplexed to the same OFDM symbol.

Figure 11:
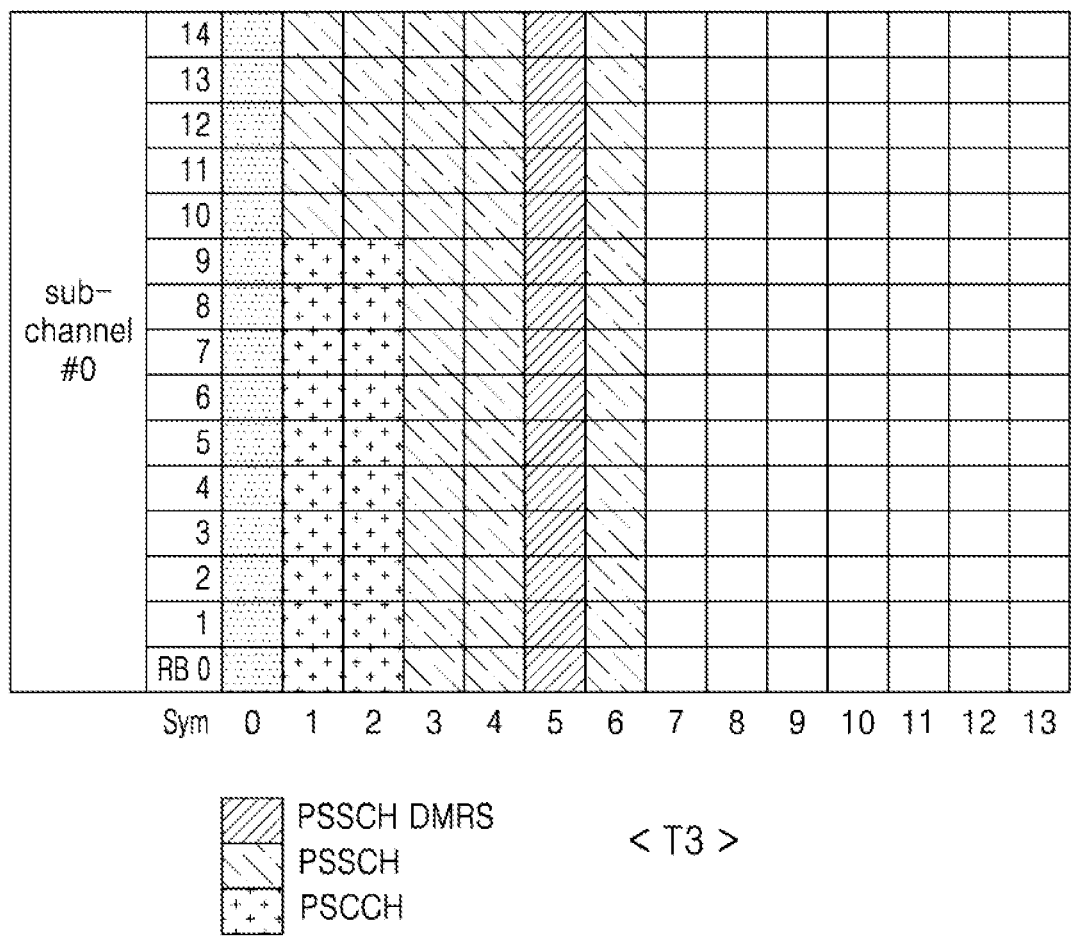

Therefore, as illustrated in FIG. 11, for example, when the PSCCH is allocated to the first and second symbols, the DMRS of the PSSCH may be allocated to the fifth symbol different from that of the PSCCH. The DMRS of the PSSCH may be allocated to a symbol different from that illustrated in FIG. 11.

For convenience of description, according to an embodiment of the inventive concept, it is taken as an example that, in the case 'T3', the DMRS of the PSSCH and the PSCCH are respectively allocated to the symbols illustrated in FIG. 11.

Then, a case 'T4' will be described with reference to FIGS. 8 and 12. When the number of subchannels is at least two and a size of the subchannel is less than 20 PRBs, the DMRS of the PSSCH and the PSCCH may be allocated to the same OFDM symbol. In addition, the number of OFDM symbols to which the DMRS of the PSSCH is allocated is at least two and at least two OFDM symbols may be common to at least two subchannels.

That is, in the case 'T4', the DMRS of the PSSCH and the PSCCH may not be multiplexed to the same OFDM symbol.

Figure 12:
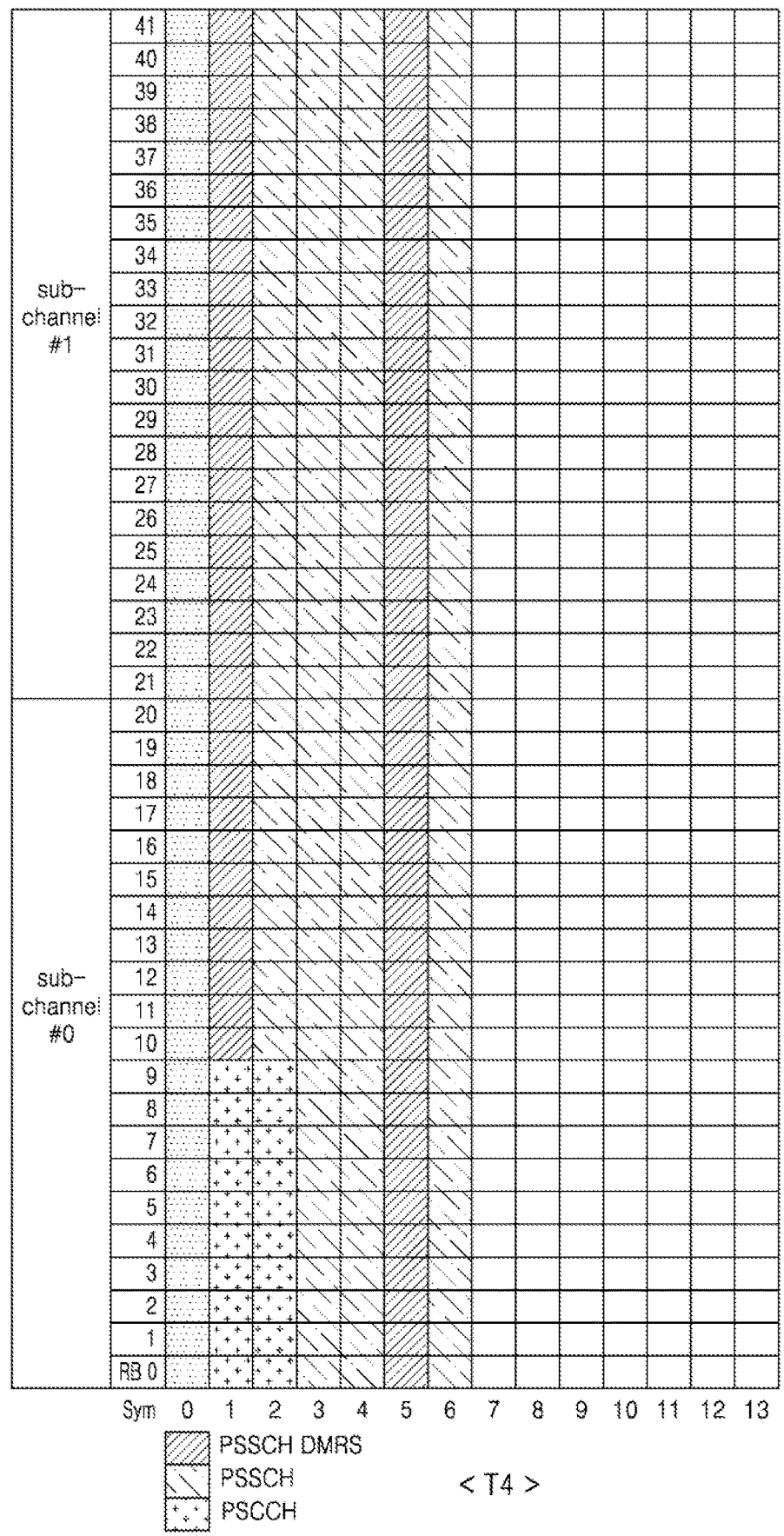

Therefore, as illustrated in FIG. 12, for example, when the PSCCH is allocated to the first and second symbols, the DMRS of the PSSCH may be allocated to the first symbol that is the same as that of the PSCCH and the fifth symbol different from that of the PSCCH over first and second subchannels (that is, sub-channel #0 and sub-channel #1).

The DMRS of the PSSCH may be allocated to a symbol (for example, the second symbol that is not the first symbol or the fourth or sixth symbol that is not the fifth symbol) different from the symbol illustrated in FIG. 12 or may be allocated to at least three symbols.

For convenience of description, according to an embodiment of the inventive concept, it is taken as an example that, in the case 'T4', the DMRS of the PSSCH and the PSCCH are respectively allocated to the symbols illustrated in FIG. 12.

Then, a case 'T5' will be described with reference to FIGS. 8 and 13. When the number of subchannels is at least two and a size of the subchannel is less than 20 PRBs, the DMRS of the PSSCH and the PSCCH may be allocated to different OFDM symbols. In addition, the number of OFDM symbols to which the DMRS of the PSSCH is allocated is at least two and at least two OFDM symbols may be common to at least two subchannels.

That is, in the case 'T5', the DMRS of the PSSCH and the PSCCH may not be multiplexed to the same OFDM symbol.

Figure 13:
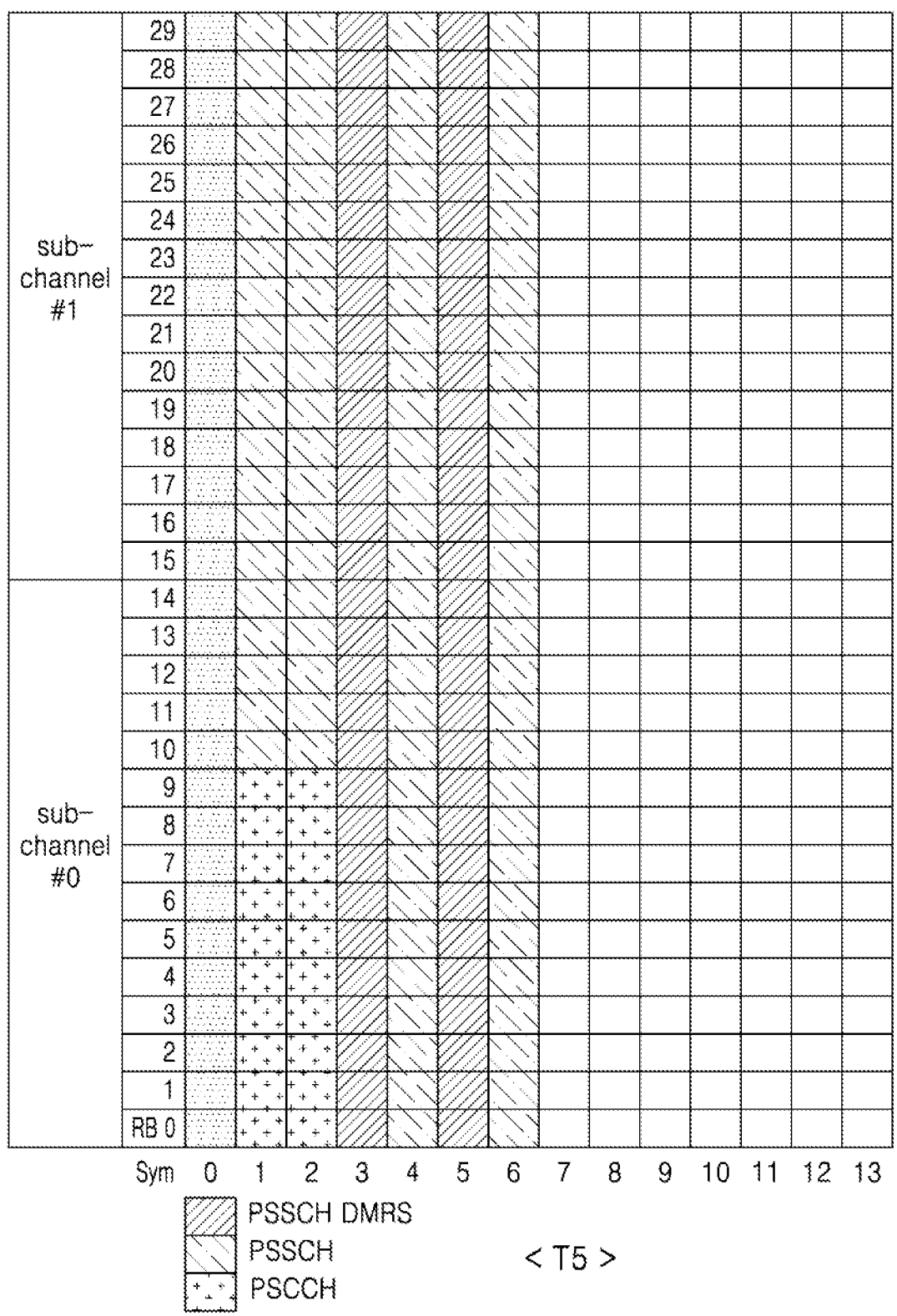

Therefore, as illustrated in FIG. 13, for example, when the PSCCH is allocated to the first and second symbols, the DMRS of the PSSCH may be allocated to the third and fifth symbols different from that of the PSCCH over the first and second subchannels (that is, sub-channel #0 and sub-channel #1). The DMRS of the PSSCH may be allocated to a symbol different from the symbol illustrated in FIG. 13 or may be allocated to at least three symbols.

For convenience of description, according to an embodiment of the inventive concept, it is taken as an example that, in the case 'T5', the DMRS of the PSSCH and the PSCCH are respectively allocated to the symbols illustrated in FIG. 13.

Then, a case 'T6' will be described with reference to FIGS. 8 and 14. When the number of subchannels is at least two and a size of the subchannel is less than 20 PRBs, the DMRS of the PSSCH and the PSCCH may be allocated to different OFDM symbols.

For instance, in the first subchannel (for example, sub-channel #0) to which the PSCCH is allocated among the at least two subchannels, the number of OFDM symbols to which the DMRS of the PSSCH is allocated is 1 and the DMRS of the PSSCH may be allocated to an OFDM symbol different from that of the PSCCH. In addition, in the second subchannel (for example, sub-channel #1) to which the PSCCH is not allocated among the at least two subchannels, the number of OFDM symbols to which the DMRS of the PSSCH is allocated may be at least two.

That is, in the case 'T6', the DMRS of the PSSCH and the PSCCH may not be multiplexed to the same OFDM symbol in the first subchannel (for example, sub-channel #0). Therefore, as illustrated in FIG. 14, for example, when the PSCCH is allocated to the first and second symbols, the DMRS of the PSSCH may be allocated to the fifth symbol different from that of the PSCCH.

On the other hand, in the second subchannel (for example, sub-channel #1), one (for example, the first symbol) of the OFDM symbols (for example, the first and fifth symbols) to which the DMRS of the PSSCH is allocated may be the same as the OFDM symbol (for example, the first symbol) to which the PSCCH is allocated in the first subchannel. The other one (for example, the fifth symbol) of the OFDM symbols (for example, the first and fifth symbols) to which the DMRS of the PSSCH is allocated may be the same as the OFDM symbol (for example, the fifth symbol) to which the DMRS of the PSSCH is allocated in the first subchannel.

Figure 14:
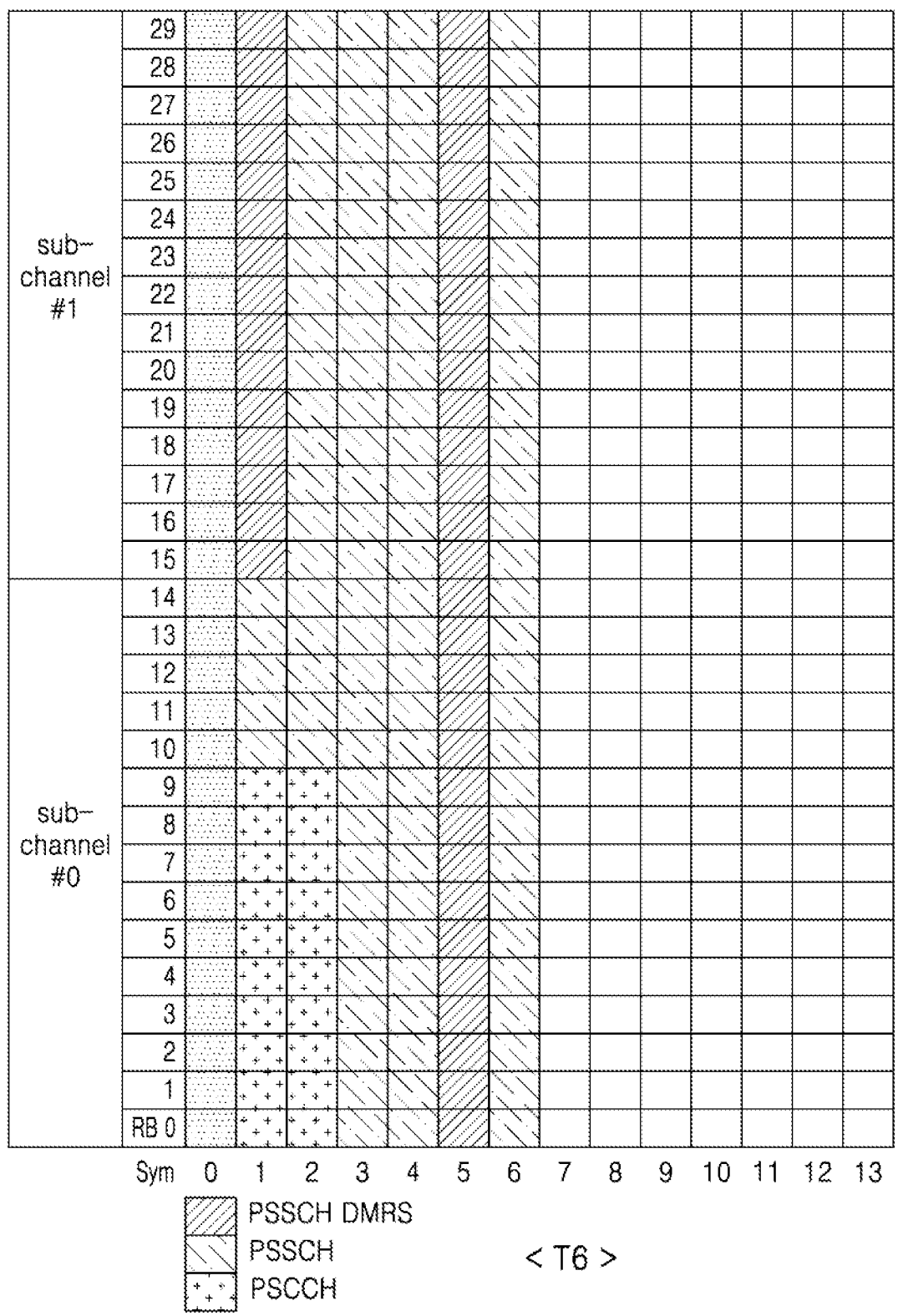

The DMRS of the PSSCH may be allocated to a symbol different from that illustrated in FIG. 14.

For convenience of description, according to an embodiment of the inventive concept, it is taken as an example that, in the case 'T6', the DMRS of the PSSCH and the PSCCH are respectively allocated to the symbols illustrated in FIG. 14.

Finally, a case 'T7' will be described with reference to FIGS. 8 and 15. When the number of subchannels is at least two and a size of the subchannel is less than 20 PRBs, the DMRS of the PSSCH and the PSCCH may be allocated to the same OFDM symbol. In addition, the number of OFDM symbols to which the DMRS of the PSSCH is allocated is at least two and at least two OFDM symbols may be common to at least two subchannels.

Thus, in the case 'T7', the DMRS of the PSSCH and the PSCCH may not be multiplexed to the same OFDM symbol.

For instance, in the first subchannel (for example, sub-channel #0) to which the PSCCH is allocated among the at least two subchannels, one (for example, the first symbol) of the OFDM symbols to which the DMRS of the PSSCH is allocated may be the same as the OFDM symbol (for example, the first symbol) to which the PSCCH is allocated. The other one (for example, the fifth symbol) of the OFDM symbols to which the DMRS of the PSSCH is allocated may be different from the OFDM symbols (for example, the first and second symbols) to which the PSCCH is allocated.

On the other hand, in the second subchannel (for example, sub-channel #1) to which the PSCCH is not allocated among the at least two subchannels, the DMRS of the PSSCH may be allocated to the OFDM symbols (for example, the first and fifth symbols) that are the same as the first subchannel. That is, the DMRS of the PSSCH may be allocated to the first and fifth symbols that are the same symbol over the first and second subchannels (that is, sub-channel #0 and sub-channel #1).

Figure 15:
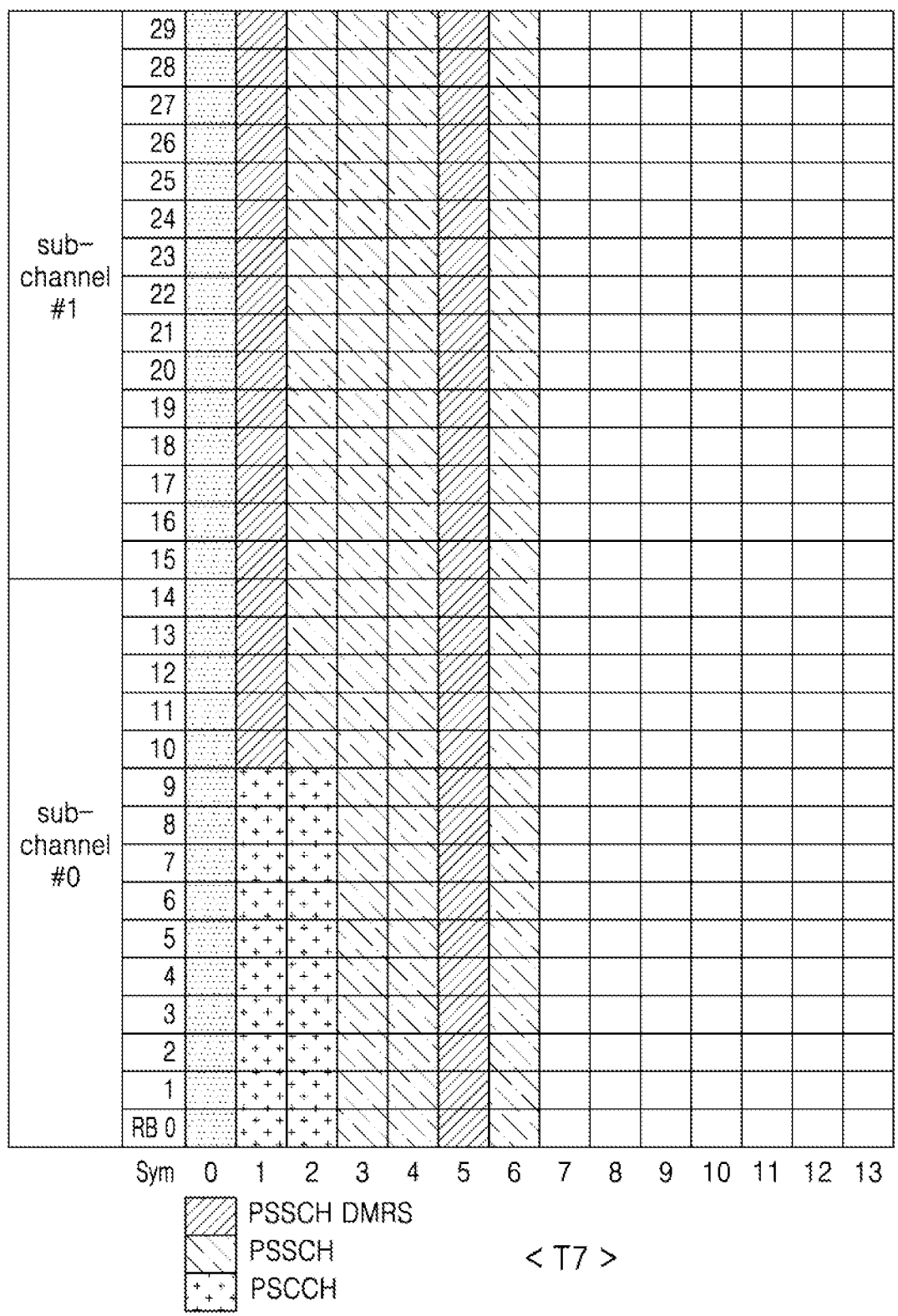

The DMRS of the PSSCH may be allocated to a symbol different from that illustrated in FIG. 15.

For convenience of description, according to an embodiment of the inventive concept, it is taken as an example that, in the case 'T7', the DMRS of the PSSCH and the PSCCH are respectively allocated to the symbols illustrated in FIG. 15.

As described above, according to an embodiment of the inventive concept, a determination of whether to allocate the PSSCH DMRS and the PSCCH to the same OFDM symbol is made in accordance with the number and sizes of subchannels. Hereinafter, referring to FIGS. 16 to 21, a method of determining the location in which the $2^{nd}$ SCI starts to be allocated according to an embodiment of the inventive concept will be described in detail.

FIG. 16 is a table illustrating a method of determining the location in which the $2^{nd}$ SCI starts to be allocated according to an embodiment of the inventive concept. FIGS. 17 to 21 are views illustrating the various $2^{nd}$ SCI mapping cases illustrated in FIG. 16.

For example, FIGS. 16 to 21 will be described with reference to FIGS. 2 and 7. Hereinafter, for convenience of description, it is taken as an example that the PSCCH is allocated to the first and second OFDM symbols and the SCI includes the 1$^{st}$ SCI (transmitted to the reception terminal through the PSCCH or received from the transmission terminal through the PSCCH) and the 2$^{nd}$ SCI (transmitted to the reception terminal through the PSSCH or received from the transmission terminal through the PSSCH). In addition, in order to simplify the drawing, a 'subcarrier' level is not displayed in the vertical axis of the drawing.

Referring to FIG. 16, the table illustrating the method of determining the location in which the 2$^{nd}$ SCI starts to be allocated according to an embodiment of the inventive concept is illustrated.

Specifically, the location in which the 2$^{nd}$ SCI starts to be allocated may be determined based on the number and sizes of subchannels.

Figure 17:
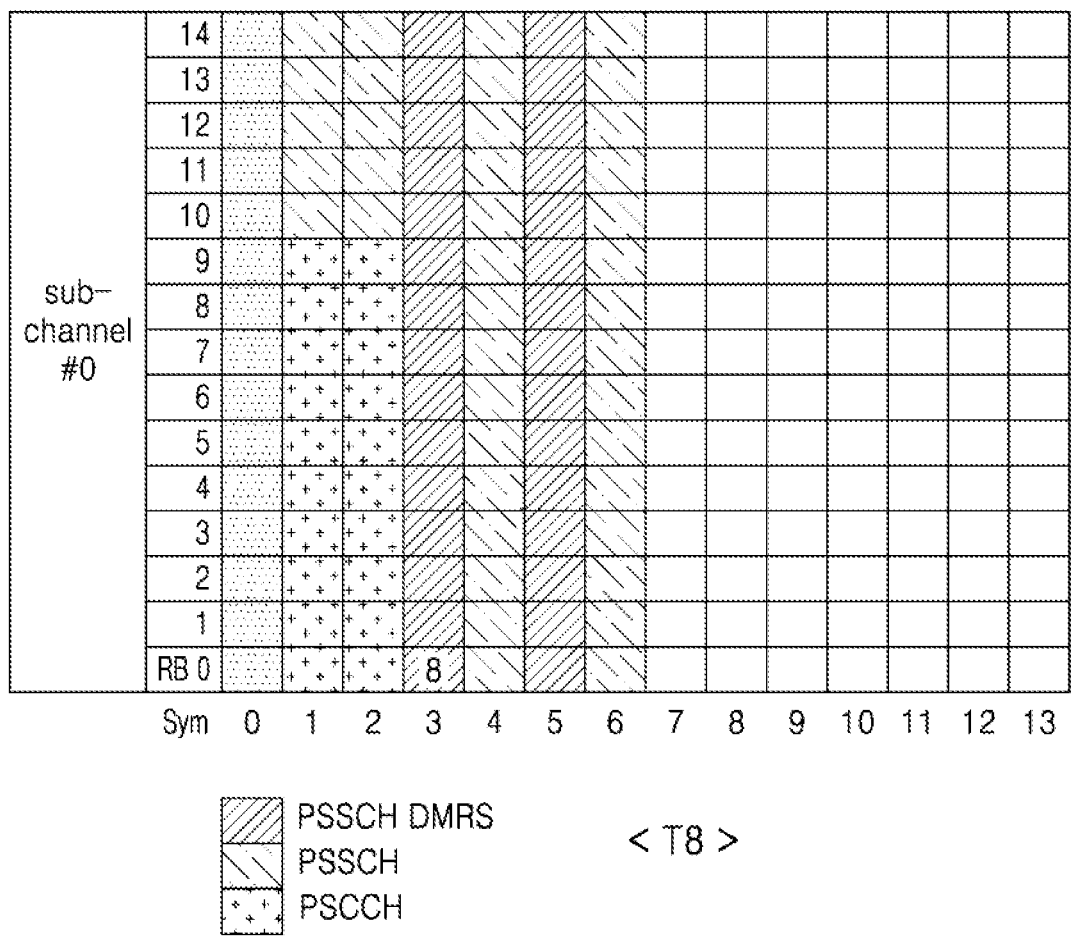
FIGS. 17, 18, 19, 20 and 21 are views illustrating respective $2^{nd}$ SCI mapping cases illustrated in FIG. 16.

First, a case 'T8' will be described with reference to FIGS. 16 and 17. When the number of subchannels is 1 and a size of the subchannel is less than 20 PRBs, the DMRS of the PSSCH and the PSCCH may be allocated to different OFDM symbols and the number of OFDM symbols to which the DMRS of the PSSCH is allocated may be at least two.

That is, the case 'T8' may be the same as the case 'T2'.

In such a situation, the 2$^{nd}$ SCI may be allocated to a first neighboring location (that is, a location '8') between the DMRS of the PSSCH and the PSCCH.

Specifically, the 2$^{nd}$ SCI may be allocated from the lowest subcarrier excluding a subcarrier for the DMRS in the first OFDM symbol (the third symbol) of the OFDM symbols (for example, the third and fifth symbols) to which the DMRS of the PSSCH is allocated.

When the 2$^{nd}$ SCI needs to be additionally allocated after the final subcarrier of the resource pool corresponding to the OFDM symbol (that is, the third symbol) is allocated, the remaining 2$^{nd}$ SCI may be allocated from the lowest subcarrier of the OFDM symbol (for example, the fourth symbol) next to the OFDM symbol.

Because the meaning of 'the lowest subcarrier' was previously described with reference to FIG. 4, detailed description thereof will be omitted.

Figure 18:
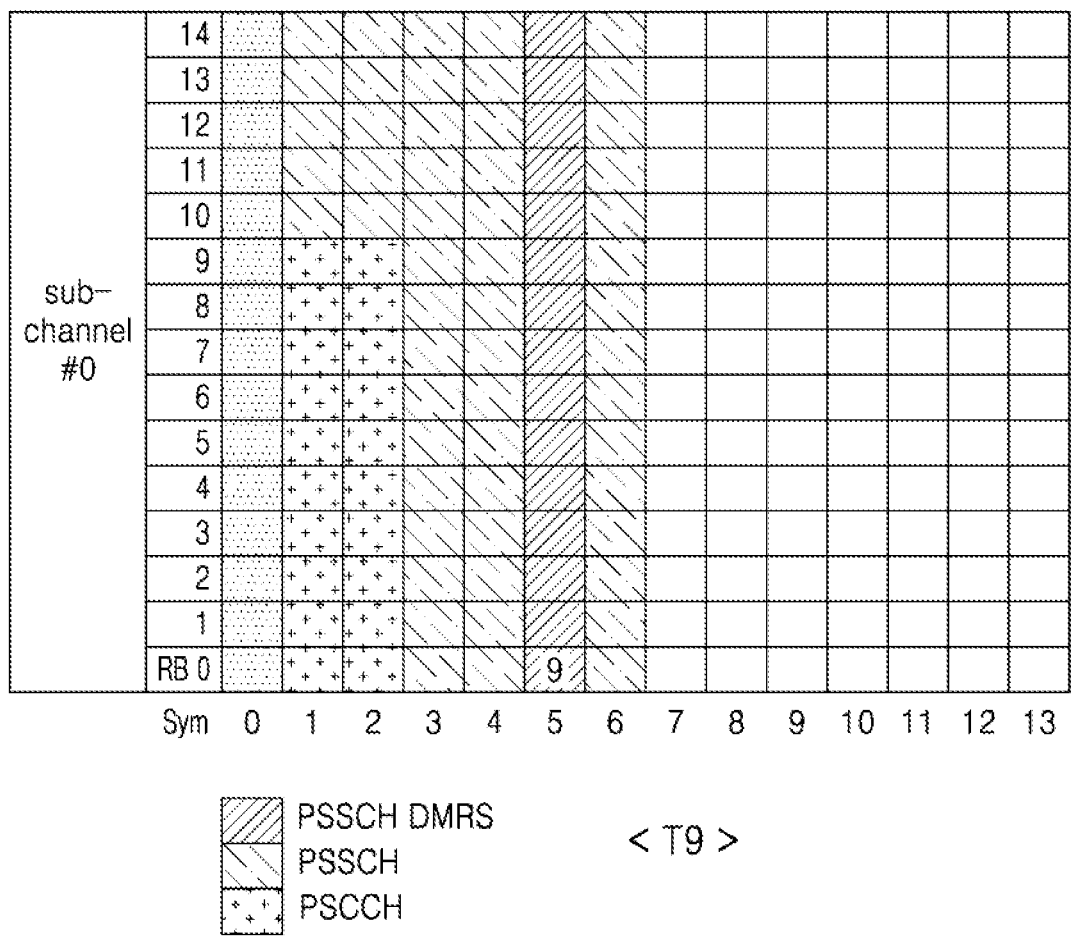

Then, a case 'T9' will be described with reference to FIGS. 16 and 18. When the number of subchannels is 1 and a size of the subchannel is less than 20 PRBs, the DMRS of the PSSCH and the PSCCH may be allocated to different OFDM symbols and the number of OFDM symbols to which the DMRS of the PSSCH is allocated may be 1.

That is, the case 'T9' may be the same as the case 'T3'.

In such a situation, the 2$^{nd}$ SCI may be allocated to a first neighboring location (that is, a location '9') between the DMRS of the PSSCH and the PSCCH.

Specifically, the 2$^{nd}$ SCI may be allocated from the lowest subcarrier excluding a subcarrier for the DMRS in the OFDM symbol (the fifth symbol) to which the DMRS of the PSSCH is allocated.

When the 2$^{nd}$ SCI needs to be additionally allocated after the final subcarrier of the resource pool corresponding to the OFDM symbol (that is, the fifth symbol) is allocated, the remaining 2$^{nd}$ SCI may be allocated from the lowest subcarrier of the OFDM symbol (for example, the sixth symbol) next to the OFDM symbol.

Figure 19:
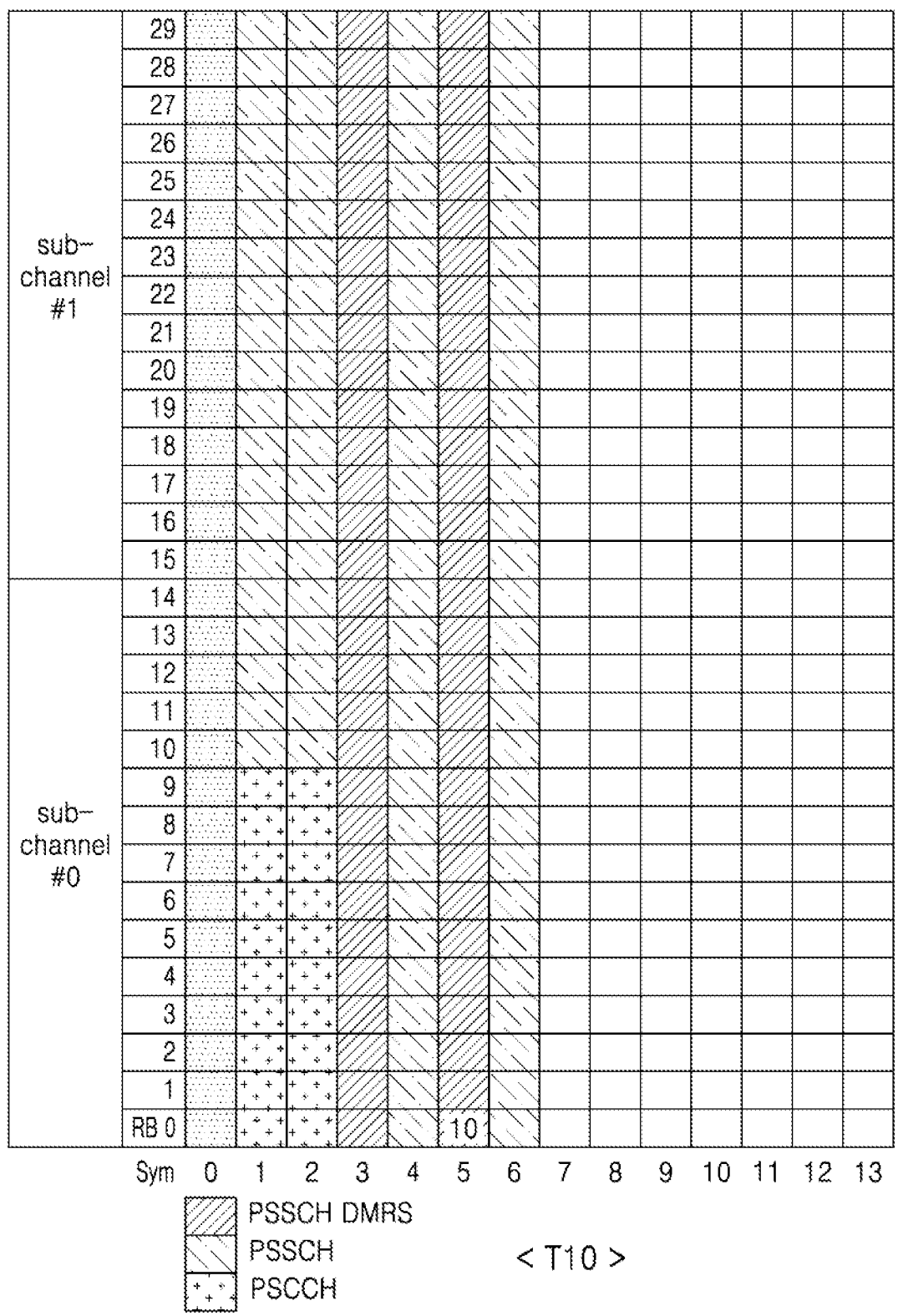

Then, a case 'T10' will be described with reference to FIGS. 16 and 19. When the number of subchannels is at least two and a size of the subchannel is less than 20 PRBs, the DMRS of the PSSCH and the PSCCH may be allocated to different OFDM symbols. In addition, the number of OFDM symbols to which the DMRS of the PSSCH is allocated is at least two and at least two OFDM symbols may be common to at least two subchannels.

That is, the case 'T10' may be the same as the case 'T5'.

In such a situation, the 2$^{nd}$ SCI may be allocated to a second neighboring location (that is, a location '10') between the DMRS of the PSSCH and the PSCCH.

Specifically, the 2$^{nd}$ SCI may be allocated from the lowest subcarrier excluding a subcarrier for the DMRS in the OFDM symbol (for example, the fifth symbol) of the OFDM symbols (for example, the third and fifth symbols) to which the DMRS of the PSSCH is allocated.

When the 2$^{nd}$ SCI needs to be additionally allocated after the final subcarrier of the resource pool corresponding to the OFDM symbol (that is, the fifth symbol) is allocated, the remaining 2$^{nd}$ SCI may be allocated from the lowest subcarrier of the OFDM symbol (for example, the sixth symbol) next to the OFDM symbol.

For example, in the case 'T10', only an embodiment in which the 2$^{nd}$ SCI is allocated to a location '10' is illustrated. However, the 2$^{nd}$ SCI may be allocated to another location (for example, in the first neighboring location between the DMRS of the PSSCH and the PSCCH) that is not the location '10'. That is, in the case 'T10', the 2$^{nd}$ SCI may be allocated from the lowest subcarrier excluding a subcarrier for the DMRS in the OFDM symbol (for example, the third symbol) of the OFDM symbols (for example, the third and fifth symbols) to which the DMRS of the PSSCH is allocated. For convenience of description, according to an embodiment of the inventive concept, in the case 'T10', it is taken as an example that the 2$^{nd}$ SCI is allocated to the location '10'.

Figure 20:
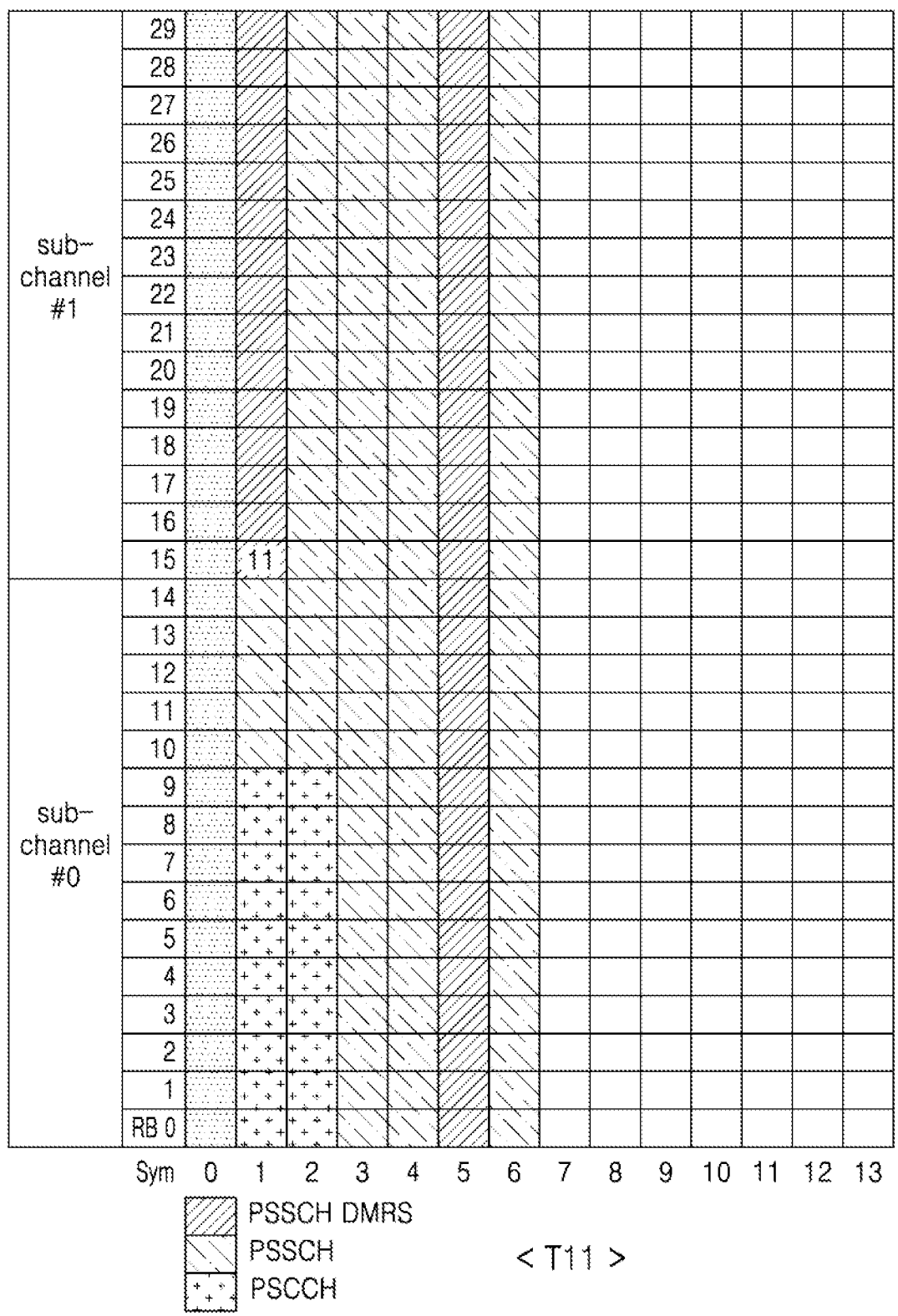

Then, a case 'T11' will be described with reference to FIGS. 16 and 20. When the number of subchannels is at least two and a size of the subchannel is less than 20 PRBs, the DMRS of the PSSCH and the PSCCH may be allocated to different OFDM symbols.

Specifically, in the first subchannel (for example, sub-channel #0) to which the PSCCH is allocated among the at least two subchannels, the number of OFDM symbols to which the DMRS of the PSSCH is allocated is 1 and the DMRS of the PSSCH may be allocated to a symbol different from that of the PSCCH. In addition, in the second sub-channel (for example, sub-channel #1) to which the PSCCH is not allocated among the at least two subchannels, the number of OFDMs to which the DMRS of the PSSCH is allocated may be at least two.

For example, the DMRS of the PSSCH and the PSCCH may not be multiplexed to the same OFDM symbol in the first subchannel (for example, sub-channel #0). Therefore, as illustrated in FIG. 20, for example, when the PSCCH is allocated to the first and second symbols, the DMRS of the PSSCH may be allocated to the fifth symbol different from that of the PSCCH.

On the other hand, in the second subchannel (for example, sub-channel #1), one (for example, the first symbol) of the OFDM symbols (for example, the first and fifth symbols) to which the DMRS of the PSSCH is allocated may be the same as the OFDM symbol (for example, the first symbol) to which the PSCCH is allocated in the first subchannel. The other one (for example, the fifth symbol) of the OFDM symbols (for example, the first and fifth symbols) to which the DMRS of the PSSCH is allocated may be the same as the OFDM symbol (for example, the fifth symbol) to which the DMRS of the PSSCH is allocated in the first subchannel.

That is, the case 'T11' may be the same as the case 'T6'.

In such a situation, the 2$^{nd}$ SCI may be allocated to a first neighboring location (that is, a location '11') between the DMRS of the PSSCH and the PSCCH.

Specifically, the $2^{nd}$ SCI may be allocated from the lowest subcarrier excluding a subcarrier for the DMRS in one (for example, the first symbol) of the OFDM symbols (for example, the first and fifth symbols) to which the DMRS of the PSSCH is allocated in the second subchannel (for example, sub-channel #1).

When the $2^{nd}$ SCI needs to be additionally allocated after the final subcarrier of the resource pool corresponding to the OFDM symbol (that is, the first symbol) is allocated, the remaining $2^{nd}$ SCI may be allocated from the lowest subcarrier excluding a subcarrier for the PSCCH in the OFDM symbol (for example, the second symbol) next to the OFDM symbol. That is, additional allocations of the $2^{nd}$ SCI may be sequentially allocated from the lowest subcarrier (that is, a subcarrier immediately above the PSCCH) excluding the subcarrier for the PSCCH in the first subchannel (sub-channel #0).

Figure 21:
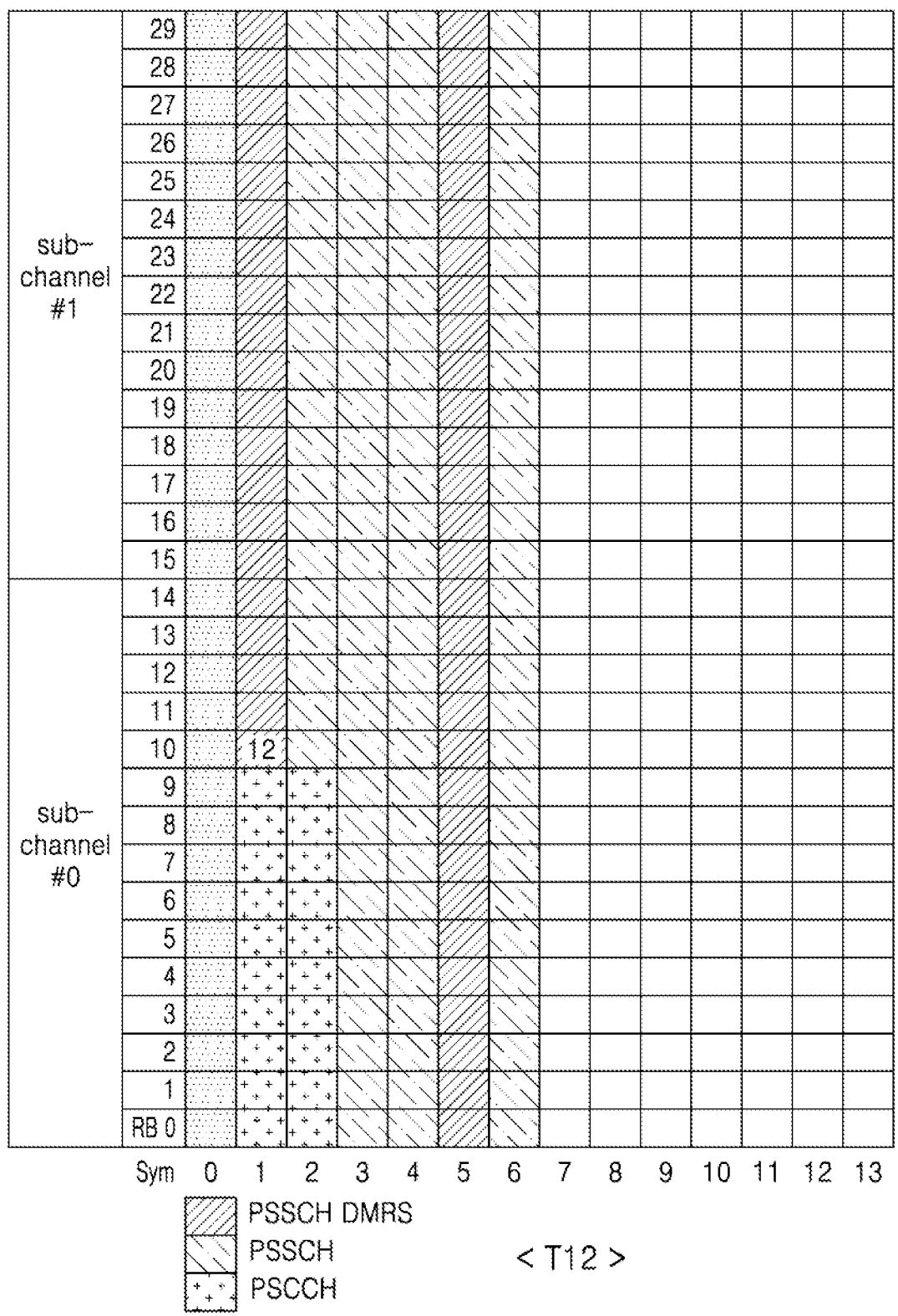

Finally, a case 'T12' will be described with reference to FIGS. 16 and 21. When the number of subchannels is at least two and a size of the subchannel is less than 20 PRBs, the DMRS of the PSSCH and the PSCCH may be allocated to the same OFDM symbol. In addition, the number of OFDM symbols to which the DMRS of the PSSCH is allocated is at least two and at least two OFDM symbols may be common to at least two subchannels.

Specifically, in the first subchannel (for example, sub-channel #0) to which the PSCCH is allocated among at least two subchannels, one (for example, the first symbol) of the OFDM symbols to which the DMRS of the PSSCH is allocated may be the same as the OFDM symbol (for example, the first symbol) to which the PSCCH is allocated. In addition, the other one (for example, the fifth symbol) of the OFDM symbols to which the DMRS of the PSSCH is allocated may be different from the OFDM symbols (for example, the first and second symbols) to which the PSCCH is allocated.

In addition, in the second subchannel (for example, sub-channel #1) to which the PSCCH is not allocated among the at least two subchannels, the DMRS of the PSSCH may be allocated to the same OFDM symbols (for example, the first and fifth symbols) as those of the first subchannel. That is, the DMRS of the PSSCH may be allocated to the same OFDM symbols, that is, the first and fifth symbols over the first and second subchannels (that is, sub-channel #0 and sub-channel #1).

That is, the case 'T12' may be the same as the case 'T7'.

In such a situation, the $2^{nd}$ SCI may be allocated to a first neighboring location (that is, a location '12') between the DMRS of the PSSCH and the PSCCH.

For instance, the $2^{nd}$ SCI may be allocated from the lowest subcarrier excluding the subcarrier for the DMRS in one (for example, the first symbol) of the OFDM symbols (for example, the first and fifth symbols) to which the DMRS of the PSSCH is allocated. The $2^{nd}$ SCI may be allocated from the lowest subcarrier excluding the subcarrier for the DMRS among subcarriers immediately above the PSCCH in the corresponding OFDM symbol (for example, the first symbol).

When the $2^{nd}$ SCI needs to be additionally allocated after the final subcarrier of the resource pool corresponding to the OFDM symbol (that is, the first symbol) is allocated, the remaining $2^{nd}$ SCI may be allocated from the lowest subcarrier excluding the subcarrier for the PSCCH in the OFDM symbol (for example, the second symbol) next to the OFDM symbol. That is, additional allocations of the $2^{nd}$ SCI may be sequentially allocated from the lowest subcarrier (that is, the subcarrier immediately above the PSCCH) excluding the subcarrier for the PSCCH.

As described above, according to an embodiment of the inventive concept, the location in which the $2^{nd}$ SCI starts to be allocated varies in accordance with the number and sizes of subchannels. Hereinafter, a wireless communication device implemented according to an embodiment of the inventive concept will be described with reference to FIG. 22.

Figure 22:
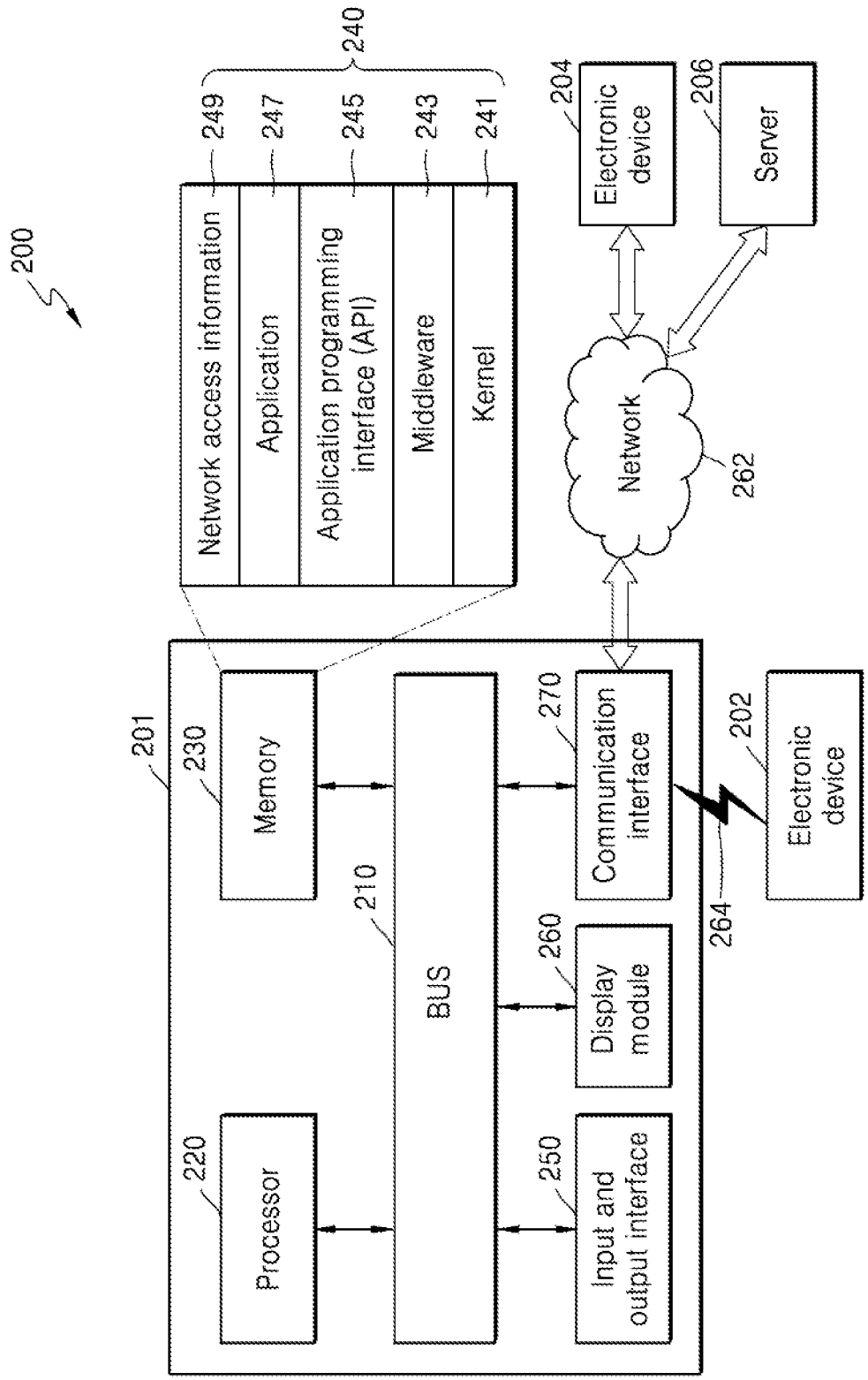
FIG. 22 is a view illustrating a wireless communication device according to an embodiment of the inventive concept.

FIG. 22 is a view illustrating a wireless communication device 201 according to an embodiment of the inventive concept. For example, the wireless communication device 201 of FIG. 22 may be applied to a BS (e.g., 51 of FIG. 2, the eNB, the gNB, or the AP) or a terminal (e.g., 53 or 55 of FIG. 2, a STA, an MS, or a UE) implemented according to embodiments of the inventive concept. Furthermore, in some embodiments, the wireless communication device 201 of FIG. 22 may operate in a standalone (SA) mode or a non-standalone (NSA) mode.

As shown in FIG. 22, the wireless communication device 201 implemented in a network environment 200 is illustrated. The wireless communication device 201 may include a bus 210, a processor 220, memory 230, an input and output interface 250, a display module 260, and a communication interface 270. In the wireless communication device 201, at least one of the above elements may be omitted or at least one another element may be included. For convenience of description, according to an embodiment of the inventive concept, it is taken as an example that the wireless communication device 201 includes the above elements.

The bus 210 may connect the processor 220, the memory 230, the input and output interface 250, the display module 260, and the communication interface 270 to one another. Therefore, signal (for example, a control message and/or data) exchange and transmission among the processor 220, the memory 230, the input and output interface 250, the display module 260, and the communication interface 270 may be performed through the bus 210.

The processor 220 may include one or more of a central processing unit (CPU), an application processor (AP), and a communication processor (CP). The processor 220 may process, for example, operations or data on control and/or communication of the other elements in the wireless communication device 201. For example, the processor 220 may include a function of the processor 150 of FIG. 7.

The memory 230 may include volatile and/or non-volatile memory. The memory 230 may store, for example, commands or instructions or data on the other elements in the wireless communication device 201.

In addition, the memory 230 may store software and/or a program 240. The program 240 may include, for example, a kernel 241, middleware 243, an application programming interface (API) 245, an application program 247 (referred to as an application), and network access information 249.

For example, at least some of the kernel 241, the middleware 243, and the API 245 may be referred to as operating systems (OS). The memory 230 may include a function of the memory 170 of FIG. 7.

The input and output interface 250 may transmit, for example, commands or instructions or data received from a user or another external device to the other elements of the wireless communication device 201. In addition, the input and output interface 250 may output commands or instructions of data received from the other elements of the wireless communication device 201 to the user or another external device.

The display module 260 may include, for example, a liquid crystal display (LCD), a light emitting diode (LED) display, an organic light emitting diode (OLED) display, a micro-electromechanical system (MEMS) display, or an electronic paper display.

In addition, the display module 260 may display, for example, various contents (for example, a text, an image, a video, an icon, and a symbol) to a user. The display module 260 may include a touch screen and may receive a touch, a gesture, an approach, or a hovering input using, for example, an electronic pen or a part of the body of the user.

The communication interface 270 may set communication between the wireless communication device 201 and an external device (for example, electronic devices 202 and 204 or a server 206). The communication interface 270 may be connected to a network 262 through wireless communication or wired communication and may communicate with the external device. In addition, the communication interface 270 may communicate with the external device (for example, the electronic device 202) through wireless communication 264. The communication interface 270 may include a function of the transceiver 160 of FIG. 7.

For example, the wireless communication 264 may use at least one of NR, LTE, LTE-A, CDMA, WCDMA, UMTS, WiBro, and GSM as a cellular communication protocol. The wired communication may include at least one of a universal serial bus (USB), a high definition multimedia interface (HDMI), a recommended standard (RS) 232, and a plain old telephone service (POTS).

In addition, the network 262 as a telecommunications network may include at least one of a computer network (e.g., LAN or WAN), the Internet, and a telephone network.

The external electronic devices 202 and 204 may be the same as or different from the wireless communication device 201. The server 206 may include a group of one or more servers.

For example, all or some of the operations performed by the wireless communication device 201 may be performed by the other external devices (e.g., the electronic devices 202 and 204 or the server 206).

In addition, when the wireless communication device 201 is to automatically perform a certain function or service or is to perform the function or service by a request, the wireless communication device 201 may perform the function or service by itself or may request the other external devices (for example, the electronic devices 202 and 204 or the server 206) to perform a partial function or service. The other external devices (for example, the electronic devices 202 and 204 or the server 206) may perform the requested function or service and may transmit the result to the wireless communication device 201. In this case, the wireless communication device 201 may process the received result as is or may additionally process the received result and may perform the function or service.

For such a mechanism, for example, cloud computing, dispersion computing, or client-server computing technology may be applied to the wireless communication device 201.

As described above, according to embodiments of the inventive concept, through the apparatus and method for effectively mapping the reference signal for the V2X communication, even in various situations that are not disclosed in TS38.214, whether to allocate the PSSCH DMRS and the PSCCH to the same OFDM symbol and the location in which the $2^{nd}$ SCI starts to be allocated may be determined.

Various functions described above may be implemented or supported by one or more computer programs and each of the programs is formed of computer-readable program code and is executed in a computer-readable recording medium. Herein, "an application" and "a program" refer to one or more computer programs, software elements, instruction sets, processes, functions, objects, classes, instances, related data, or parts thereof suitable for implementation of pieces of computer-readable program code. "Computer-readable program code" includes all types of computer code including source code, object code, and execution code. "computer-readable media" include all types of media that may be accessed by a computer such as read only memory (ROM), random access memory (RAM), a hard disk drive, a compact disk (CD), a digital video disk (DVD), and other types of memory. "Non-transitory" computer-readable media exclude wired, wireless, optical, or other communication links transmitting temporary electrical or other signals. Non-temporary computer-readable media include a medium in which data may be permanently stored and a medium in which data may be stored and may be overwritten later such as a rewritable optical disk or a deletable memory device.

While embodiments of the inventive concept have been particularly shown and described, it will be understood that various changes in form and details may be made therein without departing from the spirit and scope of the inventive concept as defined by the following claims and their equivalents.

What is claimed is:

1. A transmission terminal performing vehicle-to-everything (V2X) communication, the transmission terminal comprising:
    a processor configured to generate sidelink control information (SCI); and
    a transceiver configured to transmit the generated SCI to a reception terminal through a physical sidelink control channel (PSCCH) and a physical sidelink shared channel (PSSCH),
    wherein a decision on whether to allocate a demodulation reference signal (DMRS) of the PSSCH, and the PSCCH, to the same orthogonal frequency division multiplexing (OFDM) symbol is made based on a number of subchannels and at least one size thereof,
    wherein, when a number of subchannels is at least two and sizes of the subchannels are at least 20 physical resource blocks (PRBs), the DMRS of the PSSCH, and the PSCCH, are allocated to the same OFDM symbol of a common subchannel.

2. The transmission terminal of claim 1, wherein, when a number of subchannels is one and a size of the subchannel is at least 20 physical resource blocks (PRB), the DMRS of the PSSCH, and the PSCCH, are allocated to the same OFDM symbol.

3. The transmission terminal of claim 1, wherein, when a number of subchannels is one and a size of the subchannel is less than 20 PRBs, the DMRS of the PSSCH, and the PSCCH, are allocated to different OFDM symbols.

4. The transmission terminal of claim 3, wherein a number of OFDM symbols to which the DMRS of the PSSCH is allocated is at least two.

5. The transmission terminal of claim 4, wherein the SCI comprises first SCI and second SCI,
    wherein the first SCI is transmitted to the reception terminal through the PSCCH and the second SCI is transmitted to the reception terminal through the PSSCH, and wherein the second SCI is allocated from a lowest subcarrier excluding a subcarrier for the DMRS from a first OFDM symbol of OFDM symbols to which the DMRS of the PSSCH is allocated.

6. The transmission terminal of claim 3, wherein a number of OFDM symbols to which the DMRS of the PSSCH is allocated is one.

7. The transmission terminal of claim 6, wherein the SCI comprises first SCI and second SCI,
wherein the first SCI is transmitted to the reception terminal through the PSCCH and the second SCI is transmitted to the reception terminal through the PSSCH, and
wherein the second SCI is allocated from a lowest subcarrier excluding a subcarrier for the DMRS from an OFDM symbol to which the DMRS of the PSSCH is allocated.

8. A transmission terminal performing vehicle-to-everything (V2X) communication, the transmission terminal comprising:
a processor configured to generate sidelink control information (SCI); and
a transceiver configured to transmit the generated SCI to a reception terminal through a physical sidelink control channel (PSCCH) and a physical sidelink shared channel (PSSCH),
wherein a decision on whether to allocate a demodulation reference signal (DMRS) of the PSSCH, and the PSCCH, to the same orthogonal frequency division multiplexing (OFDM) symbol is made based on a number of subchannels and at least one size thereof,
wherein, when a number of subchannels is at least two and sizes of the subchannels are less than a predetermined number of physical resource blocks (PRBs), the DMRS of the PSSCH and the PSCCH are allocated to different OFDM symbols,
wherein, in a first subchannel to which the PSCCH is allocated among the at least two subchannels, a number of OFDM symbols to which the DMRS of the PSSCH is allocated is one and the DMRS of the PSSCH is allocated to an OFDM symbol different from that of the PSCCH, and
wherein, in a second subchannel to which the PSCCH is not allocated among the at least two subchannels, a number of OFDM symbols to which the DMRS of the PSSCH is allocated is at least two.

9. The transmission terminal of claim 8, wherein a number of OFDM symbols to which the DMRS of the PSSCH is allocated is at least two and the at least two OFDM symbols are common to the at least two subchannels.

10. The transmission terminal of claim 9, wherein the SCI comprises first SCI and second SCI,
wherein the first SCI is transmitted to the reception terminal through the PSCCH and the second SCI is transmitted to the reception terminal through the PSSCH, and
wherein the second SCI is allocated from a lowest subcarrier excluding a subcarrier for the DMRS from a second OFDM symbol of OFDM symbols to which the DMRS of the PSSCH is allocated.

11. The transmission terminal of claim 8, wherein the predetermined number of PRBs is 20 PRBs.

12. The transmission terminal of claim 11, wherein, in the second subchannel, one of OFDM symbols to which the DMRS of the PSSCH is allocated is the same as an OFDM symbol to which the PSCCH is allocated in the first subchannel, and a remaining one of OFDM symbols to which the DMRS of the PSSCH is allocated is the same as an OFDM symbol to which the DMRS of the PSSCH is allocated in the first subchannel.

13. The transmission terminal of claim 12, wherein the SCI comprises first SCI and second SCI,
wherein the first SCI is transmitted to the reception terminal through the PSCCH and the second SCI is transmitted to the reception terminal through the PSSCH, and
wherein the second SCI is allocated from a lowest subcarrier excluding a subcarrier for the DMRS from one of OFDM symbols to which the DMRS of the PSSCH is allocated.

14. A transmission terminal performing vehicle-to-everything (V2X) communication, the transmission terminal comprising:
a processor configured to generate sidelink control information (SCI); and
a transceiver configured to transmit the generated SCI to a reception terminal through a physical sidelink control channel (PSCCH) and a physical sidelink shared channel (PSSCH),
wherein a decision on whether to allocate a demodulation reference signal (DMRS) of the PSSCH, and the PSCCH, to the same orthogonal frequency division multiplexing (OFDM) symbol is made based on a number of subchannels and at least one size thereof,
wherein, when a number of subchannels is at least two and sizes of the subchannels are less than 20 PRBs, the DMRS of the PSSCH, and the PSCCH, are allocated to the same OFDM symbol of a common subchannel.

15. The transmission terminal of claim 14, wherein when a number of OFDM symbols to which the DMRS of the PSSCH is allocated is at least two, the at least two OFDM symbols are common to the at least two subchannels.

16. The transmission terminal of claim 15, wherein, in a first subchannel to which the PSCCH is allocated among the at least two subchannels, one of OFDM symbols to which the DMRS of the PSSCH is allocated is the same as an OFDM symbol to which the PSCCH is allocated and a remaining one of OFDM symbols to which the DMRS of the PSSCH is allocated is different from an OFDM symbol to which the PSCCH is allocated, and
wherein, in a second subchannel to which the PSCCH is not allocated among the at least two subchannels, the DMRS of the PSSCH is allocated to the same OFDM symbol as that of the first subchannel.

17. The transmission terminal of claim 16, wherein the SCI comprises first SCI and second SCI,
wherein the first SCI is transmitted to the reception terminal through the PSCCH and the second SCI is transmitted to the reception terminal through the PSSCH, and
wherein the second SCI is allocated from a lowest subcarrier excluding a subcarrier for the DMRS from one of OFDM symbols to which the DMRS of the PSSCH is allocated.

18. The transmission terminal of claim 14, wherein, when a number of subchannels is one and a size of the subchannel is at least 20 physical resource blocks (PRB), the DMRS of the PSSCH, and the PSCCH, are allocated to the same OFDM symbol.

19. The transmission terminal of claim 14, wherein, when a number of subchannels is one and a size of the subchannel is less than 20 PRBs, the DMRS of the PSSCH, and the PSCCH, are allocated to different OFDM symbols.

20. The transmission terminal of claim 19, wherein a number of OFDM symbols to which the DMRS of the PSSCH is allocated is at least two.

* * * * *

UNITED STATES PATENT AND TRADEMARK OFFICE
CERTIFICATE OF CORRECTION

| | | |
|---|---|---|
| PATENT NO. | : 12,284,066 B2 | Page 1 of 1 |
| APPLICATION NO. | : 17/398381 | |
| DATED | : April 22, 2025 | |
| INVENTOR(S) | : Yangsoo Kwon et al. | |

It is certified that error appears in the above-identified patent and that said Letters Patent is hereby corrected as shown below:

In the Specification
At Column 16, in Line 62, change "subchannel is less than 20 PRBs" to --subchannnel is at least 20 PRBs--.

Signed and Sealed this
Twenty-eighth Day of October, 2025

John A. Squires
*Director of the United States Patent and Trademark Office*